United States Patent
Fox et al.

(10) Patent No.: US 9,971,594 B2
(45) Date of Patent: May 15, 2018

(54) METHOD AND SYSTEM FOR AUTHORITATIVE NAME ANALYSIS OF TRUE ORIGIN OF A FILE

(71) Applicant: Sonatype, Inc., Fulton, MD (US)

(72) Inventors: Brian Fox, Goffstown, NH (US); Bruce Mayhew, Fulton, MD (US); Jamie Whitehouse, Guelph (CA); Gazi Mahmud, Berkeley, CA (US)

(73) Assignee: Sonatype, Inc., Fulton, MD (US)

( * ) Notice: Subject to any disclaimer, the term of this patent is extended or adjusted under 35 U.S.C. 154(b) by 0 days. days.

(21) Appl. No.: 15/238,008

(22) Filed: Aug. 16, 2016

(65) Prior Publication Data

US 2018/0052682 A1   Feb. 22, 2018

(51) Int. Cl.
*G06F 9/44*   (2018.01)

(52) U.S. Cl.
CPC ..................... *G06F 8/70* (2013.01)

(58) Field of Classification Search
CPC ........................................................ G06F 8/70
USPC ................ 717/120–125, 101–102, 107–108
See application file for complete search history.

(56) References Cited

U.S. PATENT DOCUMENTS

| | | | |
|---|---|---|---|
| 5,615,400 A | | 3/1997 | Cowsar |
| 5,748,884 A | | 5/1998 | Royce et al. |
| 5,754,938 A | * | 5/1998 | Herz ..................... G06Q 20/383 |
| | | | 348/E7.056 |
| 6,167,535 A | | 12/2000 | Foote et al. |
| 6,275,976 B1 | * | 8/2001 | Scandura ............ G06F 11/3608 |
| | | | 714/E11.208 |
| 6,282,698 B1 | | 8/2001 | Baker et al. |
| 6,460,036 B1 | * | 10/2002 | Herz ................. G06F 17/30867 |
| | | | 348/E7.056 |
| 6,701,440 B1 | | 3/2004 | Kim et al. |
| 6,725,214 B2 | | 4/2004 | Garcia-Chiesa |
| 6,754,883 B2 | * | 6/2004 | DeBusk ................. G06F 17/30 |
| | | | 705/2 |

(Continued)

OTHER PUBLICATIONS

Salton et al, "Generation and Search of Clustered Files", ACM Transactions on Database Systems, vol. 3, No. 4, pp. 321-346, 1978.*

(Continued)

*Primary Examiner* — Anil Khatri
(74) *Attorney, Agent, or Firm* — Posz Law Group, PLC

(57) ABSTRACT

A computer system, method, or non-transitory computer-readable medium provides an authoritative name source for files within an ecosystem. Files in the ecosystem which have identical contends and similar contents to each other are merged into the same supercluster, to capture possibly incremental changes to the files over time in one of the superclusters. For each supercluster which has files with identical and similar contents, the supercluster is broken down into package clusters, based on packages to which the files belong, each of the package clusters has the files from a same package. The package cluster which has most change frequency across versions, is identified as the authoritative package. The authoritative name for the files is resolved, based on the authoritative packages that are determined, across the plurality of superclusters which have files with identical and similar contents, and the authoritative name is generated. Any authoritative name collision is resolved.

20 Claims, 8 Drawing Sheets

(56) References Cited

U.S. PATENT DOCUMENTS

| | | | |
|---|---|---|---|
| 6,931,544 B1 | 8/2005 | Kienhofer et al. | |
| 6,947,943 B2 * | 9/2005 | DeAnna | G06F 9/465 |
| | | | 707/781 |
| 7,080,355 B2 | 7/2006 | Carlson et al. | |
| 7,149,734 B2 | 12/2006 | Carlson et al. | |
| 7,159,206 B1 | 1/2007 | Sadhu et al. | |
| 7,234,131 B1 | 6/2007 | Speyrer et al. | |
| 7,333,985 B2 * | 2/2008 | Weare | G06F 17/30699 |
| 7,340,719 B1 | 3/2008 | Bakerman et al. | |
| 7,343,386 B2 | 3/2008 | Gomes et al. | |
| 7,386,531 B2 | 6/2008 | Kiessig et al. | |
| 7,426,571 B2 * | 9/2008 | Chadalavada | H04L 67/34 |
| | | | 709/217 |
| 7,506,312 B1 | 3/2009 | Girolami-Rose et al. | |
| 7,644,101 B2 | 1/2010 | Yano | |
| 7,653,893 B2 | 1/2010 | Neumann et al. | |
| 7,680,932 B2 * | 3/2010 | Defaix | G06F 8/71 |
| | | | 709/203 |
| 7,707,162 B2 | 4/2010 | Naphade et al. | |
| 7,716,636 B2 | 5/2010 | Goncharenko et al. | |
| 7,735,068 B2 | 6/2010 | Siddaramappa et al. | |
| 7,788,632 B2 | 8/2010 | Kuester et al. | |
| 7,810,087 B2 | 10/2010 | O'Brien | |
| 7,814,078 B1 * | 10/2010 | Forman | G06F 17/30486 |
| | | | 707/698 |
| 7,844,592 B2 | 11/2010 | Shoval et al. | |
| 7,877,391 B2 | 1/2011 | Bird et al. | |
| 7,895,572 B2 | 2/2011 | Stienhans | |
| 7,958,494 B2 | 6/2011 | Chaar et al. | |
| 8,037,453 B1 | 10/2011 | Zawadzki | |
| 8,069,182 B2 | 11/2011 | Pieper | |
| 8,104,018 B2 | 1/2012 | Chessell et al. | |
| 8,156,092 B2 | 4/2012 | Hewett et al. | |
| 8,156,120 B2 | 4/2012 | Brady | |
| 8,161,470 B2 | 4/2012 | Bottomley et al. | |
| 8,225,281 B1 | 7/2012 | Hardinger et al. | |
| 8,280,755 B2 | 10/2012 | Stuhec et al. | |
| 8,296,251 B1 | 10/2012 | Athayde | |
| 8,296,398 B2 * | 10/2012 | Lacapra | G06F 17/30206 |
| | | | 209/203 |
| 8,316,344 B2 * | 11/2012 | Kaetker | G06F 8/10 |
| | | | 717/101 |
| 8,327,318 B2 | 12/2012 | Chaar et al. | |
| 8,359,285 B1 | 1/2013 | Dicker et al. | |
| 8,359,566 B2 | 1/2013 | Chaar et al. | |
| 8,359,571 B2 | 1/2013 | Clemm et al. | |
| 8,370,794 B2 * | 2/2013 | Moosmann | G06F 8/10 |
| | | | 717/101 |
| 8,473,894 B2 | 6/2013 | Fox et al. | |
| 8,479,165 B1 | 7/2013 | Kawashima et al. | |
| 8,484,617 B2 | 7/2013 | Goh et al. | |
| 8,484,625 B2 | 7/2013 | Saha et al. | |
| 8,499,284 B2 | 7/2013 | Pich et al. | |
| 8,539,437 B2 | 9/2013 | Finlayson et al. | |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 8,745,572 B2 | 6/2014 | Zimmermann et al. | |
| 8,745,583 B2 | 6/2014 | Ronen et al. | |
| 8,856,724 B2 | 10/2014 | Somani et al. | |
| 8,863,082 B2 * | 10/2014 | Tsao | G06F 9/44 |
| | | | 717/120 |
| 8,875,090 B2 | 10/2014 | Fox et al. | |
| 9,038,023 B2 * | 5/2015 | Zenz | G06F 9/44505 |
| | | | 717/120 |
| 9,043,751 B2 * | 5/2015 | Mazhar | G06F 9/5088 |
| | | | 717/120 |
| 9,043,753 B2 | 5/2015 | Fox et al. | |
| 9,100,424 B1 | 8/2015 | Thomas | |
| 9,128,801 B2 | 9/2015 | Fox et al. | |
| 9,135,263 B2 | 9/2015 | Fox | |
| 9,141,378 B2 | 9/2015 | Fox et al. | |
| 9,141,408 B2 | 9/2015 | Jackson et al. | |
| 9,207,931 B2 | 12/2015 | Fox et al. | |
| 9,224,103 B1 | 12/2015 | Subramanya et al. | |
| 9,235,572 B2 | 1/2016 | Robert et al. | |
| 9,330,095 B2 | 5/2016 | Fedorenko et al. | |
| 9,529,804 B1 * | 12/2016 | Muddu | G06Q 10/00 |
| 9,529,821 B2 * | 12/2016 | Eshel | G06F 17/30194 |
| 9,658,928 B2 * | 5/2017 | Dave | G06F 11/1471 |
| 9,678,743 B2 | 6/2017 | Fox et al. | |
| 9,697,092 B2 * | 7/2017 | Dave | G06F 11/1471 |
| 2002/0049962 A1 | 4/2002 | Kelbaugh et al. | |
| 2002/0052910 A1 | 5/2002 | Bennett et al. | |
| 2002/0055942 A1 | 5/2002 | Reynolds | |
| 2002/0059475 A1 | 5/2002 | Baentsch et al. | |
| 2003/0110253 A1 | 6/2003 | Anuszczyk et al. | |
| 2004/0010786 A1 | 1/2004 | Cool et al. | |
| 2004/0039921 A1 | 2/2004 | Chuang | |
| 2004/0046785 A1 | 3/2004 | Keller | |
| 2004/0117413 A1 | 6/2004 | Brown et al. | |
| 2004/0230949 A1 | 11/2004 | Talwar et al. | |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0204340 A1 | 9/2005 | Ruminer et al. | |
| 2005/0210441 A1 | 9/2005 | Tarr et al. | |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0048097 A1 | 3/2006 | Doshi | |
| 2006/0101092 A1 | 5/2006 | Ishida et al. | |
| 2006/0149717 A1 | 7/2006 | Bird et al. | |
| 2006/0150153 A1 | 7/2006 | Altman | |
| 2006/0200803 A1 | 9/2006 | Neumann et al. | |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0061495 A1 | 3/2007 | Cummins et al. | |
| 2007/0061792 A1 | 3/2007 | Atsatt | |
| 2007/0089086 A1 | 4/2007 | Ortloff | |
| 2007/0118899 A1 | 5/2007 | Sridhar et al. | |
| 2007/0143735 A1 | 6/2007 | Clemm et al. | |
| 2007/0250829 A1 | 10/2007 | Hillier et al. | |
| 2007/0277148 A1 | 11/2007 | Venolia | |
| 2008/0028371 A1 | 1/2008 | Brothers et al. | |
| 2008/0028378 A1 | 1/2008 | Biswas et al. | |
| 2008/0066050 A1 | 3/2008 | Jain et al. | |
| 2008/0098360 A1 | 4/2008 | Klinger et al. | |
| 2008/0109801 A1 | 5/2008 | Levine et al. | |
| 2008/0127040 A1 | 5/2008 | Barcellona | |
| 2008/0154965 A1 | 6/2008 | Pedersen | |
| 2008/0178154 A1 | 7/2008 | Basler et al. | |
| 2008/0229300 A1 | 9/2008 | O'Brien | |
| 2008/0235680 A1 | 9/2008 | Strauss et al. | |
| 2008/0270749 A1 | 10/2008 | Li et al. | |
| 2008/0281904 A1 | 11/2008 | Conrad et al. | |
| 2008/0307267 A1 | 12/2008 | Chandrasekaran | |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1 | 3/2009 | Bottomley et al. | |
| 2009/0094572 A1 | 4/2009 | Hegde et al. | |
| 2009/0119261 A1 | 5/2009 | Ismalon | |
| 2009/0133006 A1 | 5/2009 | Cheung | |
| 2009/0138843 A1 | 5/2009 | Hinton et al. | |
| 2009/0144698 A1 | 6/2009 | Fanning et al. | |
| 2009/0193063 A1 | 7/2009 | Leroux et al. | |
| 2009/0271777 A1 | 10/2009 | Tow et al. | |
| 2009/0300404 A1 | 12/2009 | Branson et al. | |
| 2009/0307662 A1 | 12/2009 | Ackerman | |
| 2009/0327994 A1 | 12/2009 | Christensen et al. | |
| 2010/0017252 A1 | 1/2010 | Chaar et al. | |
| 2010/0023919 A1 | 1/2010 | Chaar et al. | |
| 2010/0023923 A1 | 1/2010 | Chaar et al. | |
| 2010/0058291 A1 | 3/2010 | Hahn et al. | |
| 2010/0058295 A1 | 3/2010 | Johnson et al. | |
| 2010/0058307 A1 | 3/2010 | DeHaan | |
| 2010/0063975 A1 | 3/2010 | Hayes | |
| 2010/0100543 A1 | 4/2010 | Brady | |
| 2010/0106705 A1 | 4/2010 | Rush et al. | |
| 2010/0153920 A1 | 6/2010 | Bonnett | |

(56) References Cited

U.S. PATENT DOCUMENTS

| | | |
|---|---|---|
| 2010/0211924 A1 | 8/2010 | Begel et al. |
| 2010/0306730 A9 | 12/2010 | Carlson et al. |
| 2010/0325602 A1 | 12/2010 | Kraft, IV et al. |
| 2010/0333067 A1 | 12/2010 | Goh et al. |
| 2011/0010685 A1 | 1/2011 | Sureka et al. |
| 2011/0023007 A1 | 1/2011 | Chumbley et al. |
| 2011/0023016 A1 | 1/2011 | Khader et al. |
| 2011/0055186 A1 | 3/2011 | Gopalakrishnan |
| 2011/0061102 A1 | 3/2011 | Aono et al. |
| 2011/0066619 A1 | 3/2011 | Perantatos et al. |
| 2011/0119289 A1 | 5/2011 | Fields et al. |
| 2011/0137807 A1 | 6/2011 | Cha |
| 2011/0145810 A1 | 6/2011 | Forsyth |
| 2011/0161938 A1 | 6/2011 | Marum et al. |
| 2011/0231471 A1 | 9/2011 | Kudikala et al. |
| 2011/0258162 A1 | 10/2011 | Lam |
| 2011/0289098 A1 | 11/2011 | Oztaskent et al. |
| 2011/0296396 A1 | 12/2011 | Kurtakov |
| 2011/0296398 A1 | 12/2011 | Vidal |
| 2011/0307862 A1 | 12/2011 | Abrams et al. |
| 2011/0314438 A1 | 12/2011 | Surazski et al. |
| 2012/0011496 A1 | 1/2012 | Shimamura |
| 2012/0060148 A1 | 3/2012 | Jones et al. |
| 2012/0090025 A1 | 4/2012 | Milner et al. |
| 2012/0110039 A1 | 5/2012 | McKay et al. |
| 2012/0124547 A1 | 5/2012 | Halbedel |
| 2012/0144363 A1 | 6/2012 | Bernardini et al. |
| 2012/0174084 A1 | 7/2012 | Chapman et al. |
| 2012/0180024 A1 | 7/2012 | Gonzales et al. |
| 2012/0197832 A1 | 8/2012 | Shanmukh et al. |
| 2012/0246616 A1 | 9/2012 | Frontiero et al. |
| 2012/0272205 A1 | 10/2012 | Fox et al. |
| 2012/0311534 A1 | 12/2012 | Fox et al. |
| 2012/0317546 A1 | 12/2012 | Arcese et al. |
| 2012/0324419 A1 | 12/2012 | Roberts et al. |
| 2012/0331439 A1 | 12/2012 | Zimmermann et al. |
| 2012/0331447 A1 | 12/2012 | Nayak et al. |
| 2013/0007704 A1 | 1/2013 | Haynes et al. |
| 2013/0036400 A1 | 2/2013 | Bak et al. |
| 2013/0047137 A1 | 2/2013 | Bak et al. |
| 2013/0067426 A1 | 3/2013 | Fox et al. |
| 2013/0067427 A1 | 3/2013 | Fox et al. |
| 2013/0074038 A1 | 3/2013 | Fox et al. |
| 2013/0097688 A1 | 4/2013 | Bradley, II et al. |
| 2013/0191808 A1 | 7/2013 | Fox et al. |
| 2013/0212562 A1 | 8/2013 | Fox et al. |
| 2013/0219361 A1 | 8/2013 | Fiebig et al. |
| 2013/0227517 A1 | 8/2013 | Fox et al. |
| 2013/0276114 A1 | 10/2013 | Friedrichs et al. |
| 2013/0311496 A1 | 11/2013 | Fedorenko et al. |
| 2013/0326469 A1 | 12/2013 | Fox et al. |
| 2014/0026121 A1 | 1/2014 | Jackson et al. |
| 2014/0075414 A1 | 3/2014 | Fox et al. |
| 2014/0101633 A1 | 4/2014 | Fox et al. |
| 2014/0115562 A1 | 4/2014 | Fox et al. |
| 2014/0207753 A1 | 7/2014 | Fox et al. |
| 2014/0222758 A1 | 8/2014 | March et al. |
| 2014/0244679 A1 | 8/2014 | Fedorenko et al. |
| 2014/0344936 A1 | 11/2014 | Thario |
| 2016/0246699 A1 | 8/2016 | Edri et al. |

OTHER PUBLICATIONS

Yu et al, "Analysis of Effectiveness of Retrieval in Clustered Files", Journal of the Association for Computmg Machinery, vol. 24, No. 4, pp. 607-622, 1977.*

Opdeke et al, "Creating Abstract Superclasses by Refactoring" ACM, pp. 66-73, 1993.*

Sulzmann et al, "Modular Generic Programming with Extensible Superclasses", ACM, pp. 55-65, 2006.*

Guerra et al, "Patterns for Introducing a Superclass for Test Classes" ACM, pp. 1-12, 2012.*

Ruby et al, "Safely Creating Correct Subclasses without Seeing Superclass Code", ACM, pp. 208-228, 2000.*

U.S. Appl. No. 14/951,923, filed Nov. 25, 2015, Jackson et al.

Sourceforge, List of Current OSS Discovery Fingerprints [online] [retrieved on May 27, 2012] Retrieved from the internet: <http://ossdiscovery.sourceforge.net/fingerprints.html>.

Sourceforge, OSS Discovery FAQ [online] [retrieved on May 27, 2012] Retrieved from the internet: <http://ossdiscovery.sourceforge.net/faq.html>.

Cubranic et al., "Hipikat: Recommending Pertinent Software Development Artifacts," 2003, Proceedings of the 25$^{th}$ International Conference on Software Engineering (ICSE '03), pp. 1-11.

Cubranic et al., "Hipikat: A Project Memory for Software Development," IEEE Transactions on Software Engineering, vol. 31, No. 6, Jun. 2005, pp. 446-465.

Milanovic et al., "Model & Metamodel, Metadata and Document Repository for Software and Data Integration", 2008, MoDELS 2008, LNCS 5301, pp. 416-430, 2008.

Sherman, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.

Ji et al., "Efficient Interactive Fuzzy Keyword Search", WWW 2009, Apr. 20-24, 2009, ACM 978-1-60558-487-4/09/04, pp. 371-380.

Happel et al., Potentials and Challenges of Recommendation Systems for Software Development, RSSE '08, Copyright 2008 ACM 978-1-60558-228-3, pp. 11-15.

Maalej et al., "A Lightweight Approach for Knowledge Sharing in Distributed Software Teams", T. Yamaguchi (Ed.): PAKM 2008, LNAI 5345, pp. 14-25.

Gardler, "Reuse Readiness Rating", 2009, pp. 1-17, downloaded from the Internet on Apr. 1, 2013 from <url>:http://www.oss-watch.ac.uk/resources/reuseReadinessRating.

Open Source Initiative, "Home", May 5, 2010, pp. 1-2, downloaded from the Waybackmachine Internet Archive on Apr. 1, 2013.

Gacek, "Exploiting Domain Architectures in Software Reuse", 1992, ACM 0-89791-739-1/95/0004, pp. 229-232.

Prieto-Diaz et al., "Classifying Software for Reusability", Jan. 1987, IEEE Software pp. 6-16.

Meling et al., "Storing and Retrieving Software Components: A Component Description Manager", 2000, IEEE, pp. 1-11.

Robillard et al., "Recommendation Systems for Software Engineering", IEEE Computer Society, 2010, pp. 80-86.

Duan et al., "Clustering Support for Automated Tracing", ASE '07, Nov. 5-9, 2007, pp. 244-253.

David, "Recommending Software Artifacts from Repository Transactions", IEA/AIE '08 Proceedings of the 21$^{st}$ International conference on Industrial, Engineering and Other Applications of Applied Intelligent Systems: New Frontiers in Applied Artificial Intelligence, 2008, pp. 189-198.

Herbsleb, "Global Software Engineering: The Future of Sociotechnical Coordination," 2007, FOSE '07 2007 Future of Software Engineering, pp. 188-198.

Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.

Google, classpath-explorer Library which allows discovering classes at runtime, 2008. p. 1, downloaded from the Wayback Machine Internet Archive Sep. 25, 2013.

Cook et al., "An Extensible Framework for Collaborative Software Engineering", 2003, Proceedings of the Tenth Asia-Pacific Software Engineering Conference (APSEC'03), pp. 1-10.

Fitzpatrick et al., "CVS Integration with Notification and Chat: Lightweight Software Team Collaboration," CSCW'06, Nov. 4-8, 2006. pp. 49-58.

Cleland-Huang et al., "Event-Based Traceability for Managing Evolutionary Change," IEEE Transactions on Software Engineering, vol. 29, No. 9, Sep. 2003, pp. 796-810.

Notice of Allowance issued by the U.S. Patent Office dated Jan. 22, 2013 in connection with related U.S. Appl. No. 13/089,751.

Notice of Allowance issued by the U.S. Patent Office dated Mar. 15, 2013 in connection with related U.S. Appl. No. 13/483,412.

(56) References Cited

OTHER PUBLICATIONS

Office Action issued by the U.S. Patent Office dated Apr. 8, 2013 in connection with related U.S. Appl. No. 13/151,816.
Office Action issued by the U.S. Patent Office dated Apr. 9, 2013 in connection with related U.S. Appl. No. 13/231,162.
Office Action issued by the U.S. Patent Office dated Jun. 18, 2013 in related U.S. Appl. No. 13/369,617.
Notice of Allowance issued by the U.S. Patent Office dated Jul. 11, 2013 in related U.S. Appl. No. 13/780,525.
Notice of Allowance issued by the U.S. Patent Office dated Aug. 14, 2013 in related U.S. Appl. No. 13/151,816.
Notice of Allowance issued by the U.S. Patent Office dated Sep. 9, 2013 in related U.S. Appl. No. 13/231,162.
Office Action issued by the U.S. Patent Office dated Sep. 24, 2013 in related U.S. Appl. No. 13/476,160.
Office Action issued by the U.S. Patent Office dated Oct. 2, 2013 in related U.S. Appl. No. 13/554,335.
Notice of Allowance issued by the U.S. Patent Office dated Oct. 4, 2013 in related U.S. Appl. No. 13/369,617.
The International Search Report and the Written Opinion of the International Searching Authority dated Oct. 15, 2013 by the International Searching Authority in connection with international application No. PCT/US2013/041785, which corresponds to related U.S. Appl. No. 13/476,160.
Chilowicz et al. Syntax tree fingerprinting: a foundation for source code similarity detection. Sep. 29, 2011 (Sep. 29, 2011). [Retrieved on 2013-26]. Retrieved from the Internet: <URL: http://hal-upec-mlv.archives-ouvertest.fr/docs/00/62/78/11/PDF/HAL.pdf>, entire document.
Dmitriev. Safe Class and Data Evolution in Large and Long-Lived Java Applications. Mar. 2001 (Mar. 2001). [retrieved on 2013-26] Retrieved from the Internet: <URL: http://citeseerx.ist.psu.edu/viewdoc/download?doi+10.1.1.6.1812&rep+rep1&type=pdf>, entire document.
Office Action issued by the U.S. Patent Office dated Feb. 25, 2014 in connection with related U.S. Appl. No. 13/554,335.
Office Action issued by the U.S. Patent Office dated Mar. 10, 2014 in connection with related U.S. Appl. No. 13/233,265.
Notice of Allowance issued by the U.S. Patent Office dated Mar. 20, 2014 in related U.S. Appl. No. 13/476,160.
Gall et al., "Visualizing software release histories: the use of color and third dimension," IEEE International Conference on Software Maintenance, 1999 (ICSM '99) Proceedings, pp. 99-108.
Siobhan Clark et al., Verifying components under development at the design stage: A Tool to support the composition of component design models, 1998, Google, 3 pages.
Mili et al., "Storing and Retrieving Software Components: A Refinement Based System", 1994, IEEE, pp. 91-100.
Notice of Allowance issued by the U.S. Patent Office dated Jul. 9, 2014 in related U.S. Appl. No. 13/861,065.
Froehlich et al., "Unifying Artifacts and Activities in a Visual Tool for Distributed Software Development Teams," 2004, Proceedings of the 26th International Conference on Software Engineering, pp. 387-396.
Grundy et al., "Inconsistency management for multiple-view software development environments," 1998, IEEE Transactions on Software Engineering, vol. 24, Issue: 11, pp. 960-981.
Han, "Supporting impact analysis and change propagation in software engineering environments," 1997, Proceedings Eight IEEE International Workshop on Software Technology and Engineering Practice incorporating Computer Aided Software Engineering, pp. 172-182.
Office Action issued by the U.S. Patent Office dated Oct. 1, 2014 in connection with related U.S. Appl. No. 13/554,335.
Office Action issued by the U.S. Patent Office dated Oct. 7, 2014 in connection with related U.S. Appl. No. 14/078,151.
Office Action issued by the U.S. Patent Office dated Oct. 22, 2014 in connection with related U.S. Appl. No. 13/962,122.
Office Action issued by the U.S. Patent Office dated Oct. 23, 2014 in related U.S. Appl. No. 13/233,265.
Office Action issued by the U.S. Patent Office dated Nov. 26, 2014 in related U.S. Appl. No. 14/102,713.
Notice of Allowance issued by the U.S. Patent Office dated Apr. 27, 2015 in related U.S. Appl. No. 13/962,122.
Podgurski et al., "Retrieving Reusable Software by Sampling Behavior", Jul. 1993, ACM Transaction on Software Engineering and Methodology, vol. 2, No. 3, pp. 286-303.
De Luca et al., "Recovering traceability links in software artifact management systems using information retrieval methods", Sep. 2007, ACM Transactions on Software Engineering and Methology, vol. 16, No. 4, Article 13.
Ravichandran et al., "Software reuse strategies and component markets," Aug. 2003, Communications of the ACM, vol. 46, No. 8, pp. 109-114.
Notice of Allowance issued by the U.S. Patent Office dated May 15, 2015 in related U.S. Appl. No. 13/744,542.
Notice of Allowance issued by the U.S. Patent Office dated May 27, 2015 in related U.S. Appl. No. 13/554,335.
Malabarba et al., "Runtime Support for Type-Safe Dynamic Java Classes", 2000, ECOOP 200, LNCS 1850, pp. 337-261.
Liang et al., "Dynamic Class Loading in the Java Virtual Machine", 1998, OOPSLA '98, pp. 36-44.
Goldberg et al., "A Specification of Java Loading and Bytecode Verification", 1998, $5^{th}$ Conference on Computer & Communications Security, pp. 49-58.
Office Action issued by the U.S. Patent Office dated Jun. 26, 2015 in related U.S. Appl. No. 14/102,713.
Notice of Allowance issued by the U.S. Patent Office dated May 19, 2015 in related U.S. Appl. No. 13/233,265.
Williams et al., "Automatic Mining of Source Code Repositories to Improve Bug Finding Techniques", Jun. 2005, IEEE Transactions on Software Engineering, vol. 31, No. 6, pp. 466-480.
Ying et al., "Predicting Source Code Changes by Mining Change History", Sep. 2004, IEEE Transactions on Software Engineering, vol. 30, No. 9, pp. 574-586.
Storey et al., "TODO or to Bug: Exploring How Task Annotations Play a Role in the Work Practices of Software Developers", May 2008, ICSE'08, pp. 251-260.
Notice of Allowance issued by the U.S. Patent Office dated Aug. 17, 2015 in related U.S. Appl. No. 14/140,167.
Office Action issued by the U.S. Patent Office dated Aug. 26, 2015 in the related U.S. Appl. No. 14/271,648.
Cook et al., "Modelling and measuring Collaborative Software Engineering," 2005, Proceedings of the Twenty-eight Australasian conference on Computer Science—vol. 38, pp. 267-276.
Yu et al., "Traceability for the maintenance of secure software", 2008, IEEE International Conference on Software Maintenance, pp. 297-306.
Bani-Salameh et al., "A Social Collaborative virtual environment for software development," 2010, International Symposium on Collaborative Technologies and Systems (CTS), pp. 46-55.
Office Action issued by the U.S. Patent Office dated Nov. 17, 2015 in the related U.S. Appl. No. 14/102,713.
Notice of Allowance issued by the U.S. Patent Office dated Jan. 13, 2016 in connection with related U.S. Appl. No. 14/271,648.
Office Action issued by the U.S. Patent Office dated Sep. 22, 2016 in the related U.S. Appl. No. 14/102,713.
Mockus et al., "A Case Study of Open Source Software Development: The Apache Server", 2000, Proceedings of the $22^{nd}$ International Conference on Software Engineering, pp. 263-272.
International Search Report and Written Opinion of the International Searching Authority dated Jan. 30, 2017 for the corresponding international application No. PCT/US 16/61312.
Notice of Allowance issued by the U.S. Patent Office dated Jan. 11, 2017 in related U.S. Appl. No. 14/102,713.
Callahan et al., "Web-based issue tracking for large software projects," 1998, IEEE Internet Computing, vol. 2, Issue 5, pp. 25-33.
Hyland-Wood et al., "Toward a Software Maintenance Methodology using Semantic Web Techniques," 2006, IEEE, Second International IEEE Workshop on Software Evolvability, pp. 1-8.

(56) References Cited

OTHER PUBLICATIONS

Kim et al., "Classifying Software Changes: Clean or Buggy?," IEEE Transactions on Software Engineering, 2008, vol. 34, Issue 2, pp. 181-196.
Office Action issued by the U.S. Patent Office dated Aug. 10, 2017 in the related U.S. Appl. No. 14/951,923.
Communication pursuant to Article 94(3) EPC dated Jul. 17, 2017 in European Patent Application No. 13 793 818.9.
International Search Report and Written Opinion of the International Searching Authority dated Sep. 29, 2017 for the corresponding international application No. PCT/US2017/043006.
Final Office Action issued by the U.S. Patent Office dated Mar. 1, 2018 in the related U.S. Appl. No. 14/951,923.

* cited by examiner

SUPERCLUSTER OF FILES WITH IDENTICAL AND INCREMENTALLY CHANGED CONTENTS

PACKAGE RELEASE COUNT = 5
FILE VERSION COUNT = 2

201

PACKAGE CLUSTER: PKG P WITH FILE X

| 203 | 205 | 207 | 209 | 211 |
|---|---|---|---|---|
| PKG P 1.2<br>FILE X 2.0 | PKG P 1.2.1<br>FILE X 2.0 | PKG P 1.3<br>FILE X 2.2 | PKG P 1.5<br>FILE X 2.2 | PKG P 1.6<br>FILE X 2.2 |

PACKAGE RELEASE COUNT = 3
FILE VERSION COUNT = 3

221

PACKAGE CLUSTER: PKG Q WITH FILE X

| 223 | 225 | 227 |
|---|---|---|
| PKG Q 2.2<br>FILE X 2.1 | PKG Q 2.3<br>FILE X 2.1.2 | PKG Q 2.6<br>FILE X 2.2 |

PACKAGE RELEASE COUNT = 4
FILE VERSION COUNT = 3

231

PACKAGE CLUSTER: PKG R WITH FILE X

| 233 | 235 | 237 | 239 |
|---|---|---|---|
| PKG R 3.0<br>FILE X 2.1 | PKG R 3.1<br>FILE X 2.1 | PKG R 4.1<br>FILE X 2.1.2 | PKG R 4.2<br>FILE X 2.3 |

FIG. 3

| 301 |
|---|
| ▼ 050267c47d484852f42e |
| v3/repos/npm/npmjs.orgprod/v1/jquery/1.8.2/package/lib/node-jquery.js |
| ▼ 0d7896e2bb23f88e26e5 |
| v4/repos/npmnpmjs.org/prod/v1/jquery/1.7.3/package/tmp/jquery.js |
| ▼ 10ce40582bc36f783e5e |
| v4/repos/npm/npmjs.org/prod/v1/jquery/1.8.3/package/lig/node-jquery.js |
| ▼ 2fb1ecb058395d047281 |
| v3/repos/npm/npmjs.org/prod/v1/jquery/2.1.1-rc1/package/dist/jquery.js |
| ▼ 4023f6ab9d75626b4890 |
| v4/repos/npm/npmjs.org/prod/v1/jquery/1.6.2/package/dist/node-jquery.js |
| ▼ 44c20da858744b96c62a |
| v3/repos/npm/npmjs.orgprod/v1/jquery/1.6.2/package/dist/node-jquery.js |
| ▼ 48ca0833a10c45eac99e |
| v3/repos/npm/npmjs.org/prod/v1/jquery/1.11.1/package/src/jquery.js |
| v4/repos/npm/npmjs.org/prod/v1/jquery/1.11.0-rc1/package/src/jquery.js |
| ▼ 5c09832dfa0091ca87d4 |
| v4/repos/npm/npmjs.org/prod/v1/jquery/3.0.0-beta1/package/dist/jquery.js |
| ▼ 5c7a64d38ef054823af6 |
| v4/repos/npm/npmjs.org/prod/v1/jquery/1.11.0-beta3/package/dist/jquery.js |
| ▼ adc54e7bc8f083114c5e |
| v4/repos/npm/npmjs.org/prod/v1/jquery/2.12.pagkage/dist/jquery.js |
| ▼ b08cf5128a86aea81cc6 |
| v3/repos/npm/npmjs.org/prod/v1/jquery/2.1.0-beta3/package/src/sizzle/test/jquery.js<br>v3/repos/npm/npmjs.org/prod/v1/jquery/2.1.1-rc2/package/src/sizzle/test/jquery.js<br>v3/repos/npm/npmjs.org/prod/v1/jquery/1.11.1-rc1/package/src/sizzle/test/jquery.js<br>v3/repos/npm/npmjs.org/prod/v1/jquery/1.9.1/package/src/sizzle/test/jquery.js |
| ▼ eca2caa2d31e5311d9d5 |
| v4/repos/npm/npmjs.org/prod/v1/jquery/2.1.0-rc1/package/src/jquery.js<br>v4/repos/npm/npmjs.org/prod/v1/jquery/2.1.0/package/src/jquery.js<br>v4/repos/npm/npmjs.org/prod/v1/jquery/2.1.1-beta1/package/src/jquery.js<br>v4/repos/npm/npmjs.org/prod/v1/jquery/2.1.1/package/src/jquery.js<br>… |

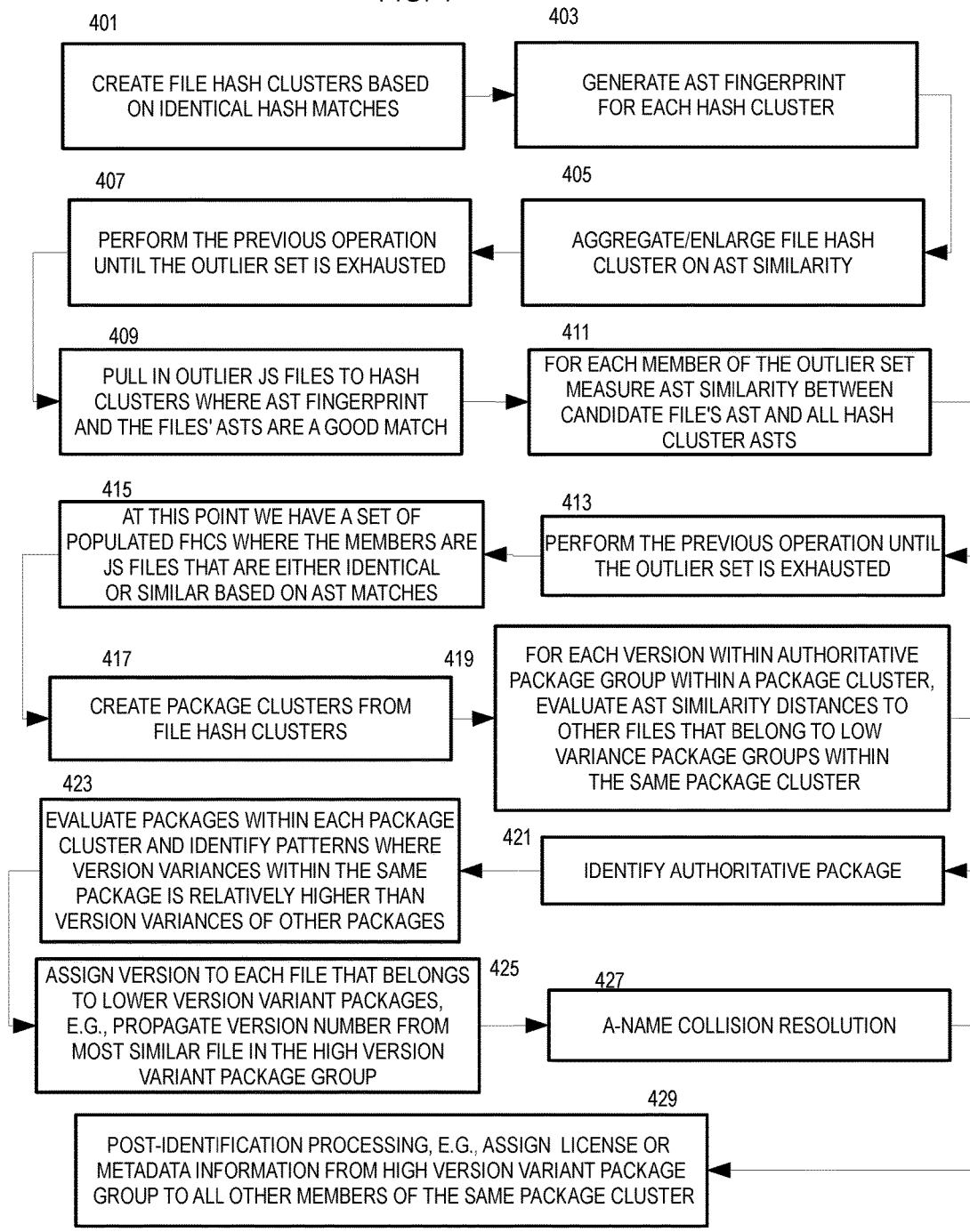

METHOD AND SYSTEM FOR AUTHORITATIVE NAME ANALYSIS OF TRUE ORIGIN OF A FILE

TECHNICAL FIELD

The technical field relates in general to software development, and more particularly to authoritatively identifying files and packages used in software development.

BACKGROUND

In today's software development field, software components that are used in connection with an application are usually written by others, and are used and re-used, possibly with changes. This trend is increasing.

A package is conventionally used to organize a set of related components intended for use by a particular application. The package may contain, by way of example, content needed to reference an external library; source code, binaries, executables, classes, and interfaces; identifying information and a manifest that identifies requirements if the package; scripts, other packages, and related items that run when the package is installed, de-installed, and/or used by a software application. A developer of a file or package typically will publish the package with that file to a repository so that the package can be shared and re-used, such as by other developers.

The available tools for software development makes it easy to use packages and software components, but these tools do not make it easy to understand where the package or the files in the package originated. Compounding the lack of visibility and understanding is the fact that packages and files in packages tend to depend on other components and/or packages and files which may themselves be used or re-used, possibly with changes.

A software repository is a known technique to provide developers with a convenient collection of re-used and re-usable packages and software components, where the package and/or component in the software repository may be a copy or specialized version and/or may incorporate other components and/or packages such as by dependency. A conventional repository manager can be used as a central point of storage and exchange for packages and software component usage. Package management systems are available which can provide tools to automate distribution of packages, can maintain information about dependencies and version information, and can work with software repositories. For a single ecosystem which is a collection of software repositories and/or support systems all of which store interrelated files, there can be thousands of distinct software packages with their attendant files.

Nevertheless, the problem with visibility and understanding of packages and the software components remains. There may be numerous files in a repository which are essentially the same component but which might have minor variations in content and/or name; any of these components might have originated elsewhere in the ecosystem. Using a repository manager or a package manager to identify the software repository where an application, package or component is stored or managed, does not necessarily correctly identify where that package or component actually originated and does not necessarily identify the name of the original file or the package where the file originated.

In particular, with all of the sharing of files via packages, it remains problematic to correctly locate the original name and version of a file which appears in different packages, in combination with the original package which originated that component.

SUMMARY

Accordingly, one or more embodiments provide a computer system which provides an authoritative name source for files within an ecosystem. The computer system includes at least one processor is configured to perform the following.

The files in the ecosystem are clustered into a plurality of superclusters, in which the files in each supercluster of the plurality of superclusters have identical contents. Then, of the files in the ecosystem which are clustered into the plurality of superclusters, which of the files have similar contents to each other are determined, and the files which have similar contents to each other are merged into the same supercluster, to capture possibly incremental changes to the files over time in one of the superclusters which has the files with identical contents and similar contents.

For each supercluster which has the files with identical and similar contents, the following is performed. Each supercluster is broken down into package clusters, based on packages to which the files belong, so that each of the package clusters has the files (that is, the files with identical and similar contents (probably due to incremental changes) from a same package. Which of the package clusters has most change frequency across versions is determined, as the authoritative package.

Then, an authoritative name for the files is resolved, based on the authoritative packages that are determined, across the plurality of superclusters which have files with identical and similar contents, and generating the authoritative name. Any authoritative name collision is resolved.

In an embodiment, a hash of file contents of each of the plurality of files is used to determine which of the files have identical contents, and the clustering of the files in the superclusters with identical contents is determined based on the hashes of file contents.

In an embodiment, for each supercluster, the each supercluster includes an indication of a source within the ecosystem for each file of the files, and the breaking down into the package clusters is based on the indication of the source of the each file.

In an embodiment, an abstract syntax tree of file contents of each of the plurality of files is prepared, and the abstract syntax trees are used to determine whether contents of files are similar, and the determining of files with similar contents into the same supercluster is based on the abstract syntax tree of file contents, In an embodiment, for each supercluster, the each supercluster includes an indication of a source within the ecosystem for each file of the files.

In yet another embodiment, breaking each supercluster down into package clusters includes generating package names and versions for members of the supercluster; aggregating package clusters on package name and counting unique changes to the package cluster; and determining, for each package cluster, the most change frequency among the package clusters.

In still another embodiment, the authoritative name is resolved by merging authoritative package outliers into groups which are merged into package cluster based on file name; and the resolved authoritative name and source are identified.

In yet a further embodiment, whether the authoritative name source is correct is determined based on the ecosystem in which authoritative name source originated.

In still another embodiment, the ecosystem, in which the files are located which are clustered, includes at least one software repository in which the files are located.

A further embodiment is a computer-implemented method, according to one or more of the above embodiments.

Still another embodiment is a non-transitory computer-readable medium comprising instructions for execution by a computer, the instructions including a computer-implemented method as above, the instructions for implementing the method in a processor.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 2 is a block diagram illustrating a supercluster of files with identical and incrementally changed contents, broken down into package clusters;

FIG. 3 is a simplified file listing of files by hash across multiple versions in a package cluster;

FIG. 4 is an overall flow chart illustrating a procedure for authoritative name analysis;

DETAILED DESCRIPTION

I. Introduction

Figure 1:
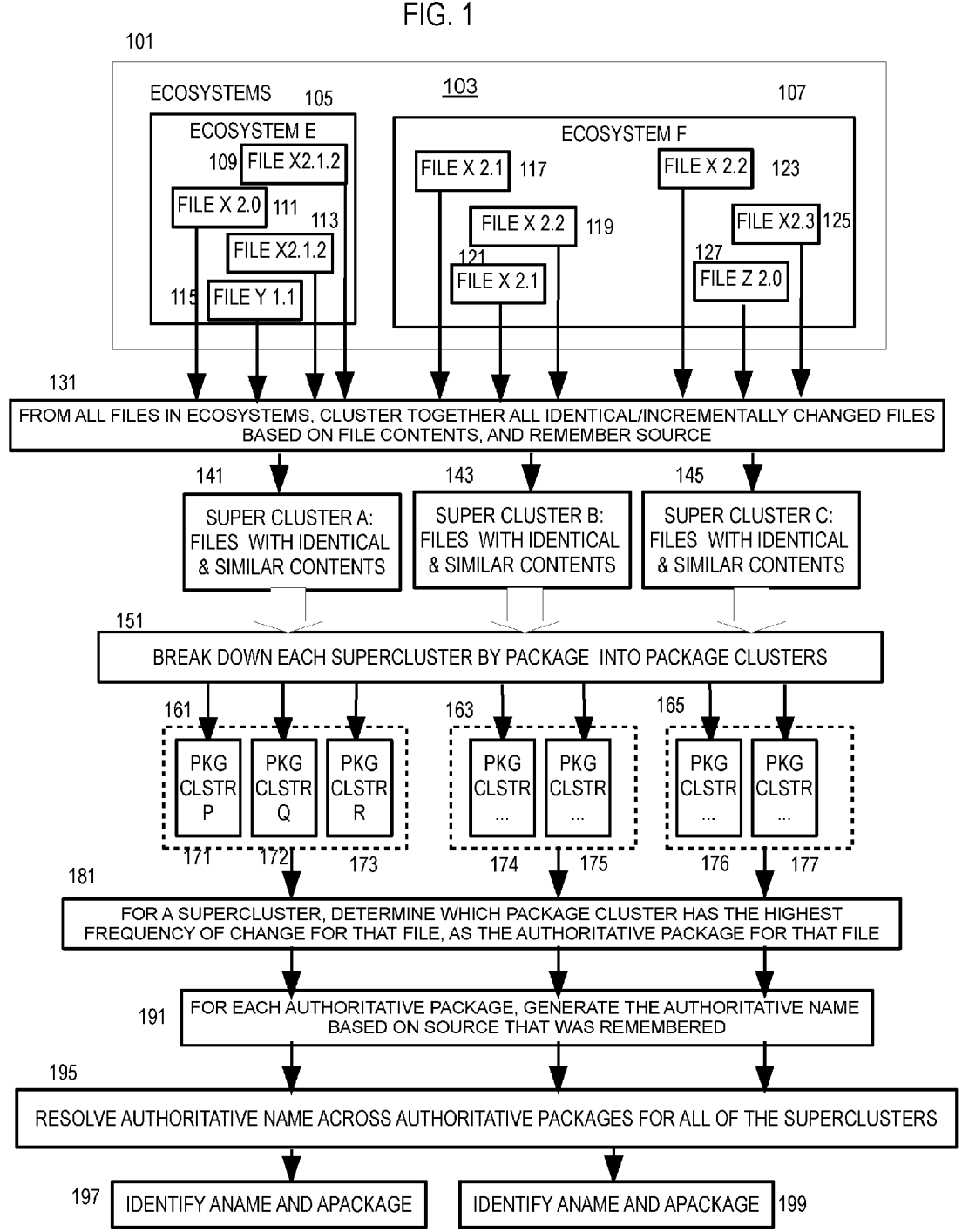
FIG. 1 is a data flow diagram illustrating flow in a computer system for authoritative name analysis.

In overview, the present disclosure concerns observing a file in a packaged application and indicating what is known about said file; more particularly uniquely identifying a correct name for a file within an ecosystem(s) which has numerous files, and/or identifying the actual origin of the file within the ecosystem, in which a package which may be associated with the packaged application comprises different self-contained software components which are stored in the ecosystem, the ecosystem may include one or more software repositories which support different packages, and the software components and packages are used and re-used by developers. Even more particularly, the present disclosure concerns attempting to identify, from all of the files in that ecosystem, a package in which a file changes or is a new version each time the package is released, which package will be considered to be the authoritative source of the file; the authoritative name of the file can be identified from the package which is the authoritative source. The present disclosure builds on a hypothesis that an original author of a file will not push a new package of that file unless that file is changed; whereas a developer that merely uses the package with that file will likely not change that file in every release of a package.

More particularly, various inventive concepts and principles are embodied in systems, devices, and methods therein for an authoritative name analysis that definitely determines, for a given file, the true origin of the file (a so-called authoritative package), independent of how the file is packaged in an ecosystem, and which determines the authoritative name of the file. The authoritative name comprises the name of the file and a canonical version.

The approach discussed herein to component identification can provide superior support for component identification, e.g., Java component identification in a programming language sold under the trademark or tradename JAVA, compared to available techniques. The strength of this approach can be enhanced by use of a few known conventions A-D below in the Maven/Java ecosystem which are noted at the outset in a software project management tool sold under the trademark MAVEN:

A. Clear Distinction Between Release and Development Versions:

Maven includes the concept of a SNAPSHOT version that is used for development. It also includes numerous tools for release automation to create release binaries.

B. Large Centralized Repository:

These release binaries are typically published to the Central Repository, run and sponsored by Sonatype. The central repository contains all releases since the beginning of Maven usage as immutable binaries.

C. Standardized Rich Metadata Format:

The conventional POM format used for the pom.xml file for component metadata is well standardized and therefore suitable for automated parsing. It is also comprehensive enough to allow for detailed component and dependency information.

D. Typically Immutable Components:

The immutable release binaries in the Central Repository and other repositories are typically consumed and used by other applications, without being modified. While modifications from simple file renames, recompilation, tree shaking, shading and others are possible, they are not the common use case.

The above conventions A-D might be expanded to other repositories and/or ecosystems.

II. Problem Presentation and Observations

A. Problem Statement

Previously, in software repositories, partial matching and recognizing of third party system components has been performed. This approach was primarily Java-specific and works well for Java environments. In other environments and/or languages, such as NuGet, npm, Python, Ruby, etc. there is a package vs. component problem. Java uses JARs, and therefore the software repositories use JARs and are very well-behaved. Nevertheless, other languages and environments use files which contain components, e.g., DLL files and others. The ecosystems tend to be massively not well behaved. For example, in a NPM repository, developers are not using the proper build format for using JQuery (which is used as a convenient example) but instead incorporate their own version of JQuery. Complicating the problem in this example is that JQuery (as an example) changes in every release.

There are other problems in attempting to identify a name and authoritative source of a file, caused by something even as simple as files not being named properly by developers. This complicates identification of the file name and/or file type.

All of this can occur in a Big Data environment with thousands of files.

Further, simply matching the text of an identical file name is easy, but confusing because a filename may not be the commonly recognized name.

As a simple example, the following steps will usually not identify the authoritative name:
1. recognize a javascript file (this is a routine technique)
2. determine the file name.

Nevertheless, it is difficult for the computer to determine whether the file is a form of some real name as known to humans.

Using a timeline so as to identify the first or earliest component in a software repository ordinarily is not helpful, because a component may be added to a software repository asynchronously, and/or without regard to whether the component is the ultimate source.

Furthermore, as the usage of repositories and repository managers is adopted by other ecosystems, less mature or suitable usage patterns emerge and have to be considered for component identification and software supply chain management efforts.

The typical enterprise usage also includes component usage that spans ecosystems. In fact, this behavior is the norm. Consequently, it is likely that a particular file did not originate in the same ecosystem in which it is being used. An effect is that it is probably erroneous to simply identify the earliest use of that file, or the earliest project corresponding to that file.

All of these technical advances lead to numerous problems with precise component identification, which can cause problems with, for example, software supply chain management.

B. Problem Example—JavaScript and JQuery

Reference is now made to a real example to showcase some aspects of the problem.

JQuery is a very popular JavaScript framework used for web application development. Even the official download page mentions numerous options and formats:
  Direct download of the compressed (=minified) file for production usage
  Direct download of the uncompressed file for development
  Download with npm
  Download with bower
  Download from/Reference to numerous CDN hosting options Of course, there are numerous older releases of JQuery with three major versions currently available. There are also subprojects such as jquery mobile and jquery colors available. One will appreciate, even for the core jquery library, there are numerous ways to obtain the code and the library.

Now consider a typical usage. As a library sold under the trademark or tradename JavaScript, JQuery designed for client side usage in a web browser is used in many web applications. These are written in various different development stacks sold under trademarks or tradenames such as Node.js, .Net and Java. Respectively, j query files can be found in many web applications in the repositories for these stacks: not only in Maven repositories such as the Central Repository, in repositories sold under the trademark or tradename NuGet used by .Net developers such as the repository offered under the trademark NugetGallery, in a repository offered under the trademark or tradename NPM-HS.ORG used by Node.js developers, but also in many others including internal repositories using the different formats. As a result, a developer might for example find a Java WAR file that contains a jquery.js file in the a js or other folder inside the WAR archive.

As another complication, the libraries by themselves are often also packaged in the specific repository format to ease the usage. For example, JQuery is distributed via, among many others:
  npm https://www.npmjs dot com/package/jquery
  NuGet https://www.nuget dot org/packages/jQuery
  Maven http://repo1.maven dot org/maven2/org/webjars/jquery/

These redistributions are often not managed by the actual JQuery project itself. JQuery is also used by many other libraries, written in JavaScript or any other stacks, as a dependency that provides functionality as a foundation for further features and therefore is embedded in the relevant packages.

Keeping this in mind, a current analysis finds that a jquery.js file is found in roughly 72,000 packages across the various packaging systems and repositories in one ecosystem. The total number of distributions is even higher, and the number of packages continues to increase.

C. Challenges

The sheer amount of packages to analyze and the resulting data that needs to be sifted itself poses a challenge.

In addition, there other important challenges which include the following.
  How can the system figure out that the file jquery.js occurs in a specific package merely because it is simply used in that package?
  How can the system determine the specific version of jquery which this package contains? And how can the system differentiate this package's version of jquery from an original jquery distribution itself in a specific packaging format?
  How can the system recognize that some file is actually the original jquery despite jquery having been included in 72,000 different packages, so that the system can provide the right metadata which corresponds to the original jquery?

Solving these questions is necessary to be able to correctly associate the right metadata to the right packages, so as to provide the correct information downstream. For example, a correct identification of components within other components and their distribution supports the creation of a correct bill of materials of an application or the performance supply chain management without wasted efforts.

These challenges affect all software ecosystems and software packaging systems. Accordingly, solving the identification problem is not at all isolated to JavaScript usage.

D. State of the Conventional Art

There are problems with current approaches. What is not working today, is that the identification problem has not been solved. Without solving the identification problem in detail, any further efforts are flawed. And that is exactly where the conventional art is.

Conventional systems which assert JavaScript support often mean that *.js files are identified as JavaScript and not much more beyond.

Some conventional systems can identify jquery.js as JQuery, but fail when the file is renamed. Some conventional systems fail when JQuery is embedded in other files nested in archives. Some conventional systems fail to identify the version of JQuery.

Although JavaScript support is regularly marketed as a feature of conventional products, the inventors have not observed truly working support necessary for efficiently and correctly identifying files and packages. In fact, similar issues are found in actual use of conventional Java/Maven support products.

III. Aspects of the Approach

Further in accordance with exemplary embodiments, there is provided a method and system that resolve the issues mentioned above.

As further discussed herein below, various inventive principles and combinations thereof are advantageously employed to allow determination of the authoritative name of a package.

A. Concept Summary

The overall concept is to identify the authoritative source of a file, and the authoritative name of a file. The point is to be able to identify that a component is a form of something authoritative, which is known to the developers. As a brief summary, the concept uses the following steps, in an ecosystem which has large numbers of files:

1. Cluster the files in an ecosystem(s) into superclusters of files, where each supercluster has identical and partially matching components/files, while retaining an indication of the package source of each component/file. Each supercluster thus has all of the different packages which use and re-use the basically identical file (as that file incrementally evolves from time-to-time).

2. Within each supercluster, cluster the same packages together and look for the smallest package cluster, which is the package cluster in which the file incrementally evolves with the highest frequency. Consider the package cluster with the highest frequency of change to identify the package which is the authoritative source of a file, and from there ascertain the authoritative name of the file.

This solution is totally counter-intuitive to the usual use of clustering of files which relies on the highest confidence (largest) cluster instead of the smallest and thus ordinarily the lowest confidence cluster.

B. Authoritative Name and Authoritative Package Concept

A goal of the Authoritative Name analysis herein is to correctly determine the authoritative name of a package. The authoritative name is the identifier used for a package that ties the package to the original upstream release of a component and therefore the correct metadata.

The solution to the problem discussed in the above section is correct and precise component identification. The redistribution and nesting of components is handled by determining which packages were redistributed within another package, as distinguished from real distribution based on an original upstream project. As an advantage, attachment of the correct metadata to the component is possible when this is achieved. The process and system discussed herein makes this distinction possible.

There are several advantages of this approach, including the following examples. The concept behind the authoritative name identification can be independent of the packaging system(s) by which components are distributed. The concept of authoritative name identification enables a new quality of component identification in JavaScript and other ecosystems. Authoritative name identification can enable further improvements, such as to the Java/Maven support and others.

Consider, as a simple example, the JavaScript library Clipper has a dependency to jquery. The authoritative name analysis of any Clipper package should result in an authoritative name of "Clipper"; the authoritative name analysis of any "ApplicationX" that uses Clipper should result in an authoritative name of "ApplicationX". However, neither the Clipper package nor ApplicationX can result in an authoritative name of "jquery".

On the other hand, authoritative name analysis of any redistribution of JQuery in npmjs.org, the NuGet Gallery or the Central Repository, should result in the authoritative name of "jquery".

Authoritative name analysis of any usage of the identical jquery file, or even a renamed or custom minified copy of the original jquery.js, within an application, should result in the identification of this component within an application as "jquery"—not "Clipper" or any other authoritative name.

From a developer's perspective, the authoritative name analysis can work off just the distributable application archive or other specified group of files. The authoritative name analysis does not require any build time declaration or other context specific information to provide correct results. Consequently, a developer can provide an authoritative name analysis even of a binary running in a production environment.

All contents of an application distributable can be extracted and precisely identified for authoritative name and version. As a result, a developer can provide correct association of metadata, and a creation of a complete bill of materials or other usage of the metadata.

The Authoritative Name analysis discussed herein can provide support for the JavaScript ecosystem and/or other ecosystems.

The nature of the authoritative name analysis includes large data mining and analysis efforts because the ecosystems tend to have thousands of files.

IV. Details of Concepts and Variations

The following example and some variations are well suited to demonstrate various implementation details and advantages.

A. Overview

The following is an overview of the steps which can be followed to provide an authoritative name analysis. This example mentions Javascript, but it should be noted that the authoritative name analysis is intended to be applied and adapted (if necessary) to non-Javascript files as well.

1. Identify the contents of every file in the ecosystem (s)—Collect the hash of every Javascript file across the various ecosystems 2. Determine all files which have identical contents—Create file hash clusters (FHC) for all Javascript files, in which each cluster has only files with identical contents based on, e.g., hash of file contents 3. Determine all files which have contents which are incrementally changed from the identical files—Aggregate/enlarge file hash clusters, e.g., based on Abstract Syntax Tree ("AST") similarity 4. For a cluster of identical/incrementally changed files, determine the packages the files belong to, further break those packages down by versions, and identify the package with the "most change" frequency for that file—Create package clusters from file hash clusters 5. Pull any outlying files back into the package version group in which they belong—Create package version groups from the package cluster based on authoritative package versions 6. Resolve authoritative name collisions among the clusters of files—Generate AName from authoritative package version groups The purpose of steps 1-3 is to find all of the different versions of a file and partially modified files from those versions, for example, to put all of jquery files into a supercluster. The purpose of the next steps 4-6 is to sort the supercluster out, to determine the versions, the packages, the authoritative package and the authoritative name, for the file. The steps can handle variant cases to achieve a more correct result.

All of the above are discussed in more detail in the following section in connection with FIG. 1, a data flow diagram illustrating flow in a computer system for authoritative name analysis. As illustrated in FIG. 1, there are files in packages (not illustrated) in one or more ecosystems 103, here represented by Ecosystem 105 and ecosystem F 107. Files in ecosystem E 105 include File X 2.1.2 (plural copies), File X 2.0, and File Y 1.1 109-115. Files in ecosystem F 107 includes File X 2.1 (plural copies), File X 2.2 (plural copies), File X 2.3, and File Z 2.0 117-127. The ecosystem(s) have only those files of which the ecosystem is aware, and accordingly, there are gaps in versions and package releases in the ecosystem. The files are identified 101, and then from preferably all of the files in the ecosystems 103, the analysis clusters 131 together, into superclusters, all identical and incrementally changed files based on file contents, and remembers the source where the files originated. Here, each of supercluster A, B and C 141, 143, 145 has different files, and the files in one supercluster have identical and sufficiently similar (i.e., incrementally changed) contents to each other.

Then each supercluster 161, 163, 165 is broken down by package into package clusters 171-177, in which each package cluster has files from the same package. Then, for each supercluster, the analysis determines 181 which package cluster has the highest frequency of change for that file, which is the authoritative package for that file. For the authoritative package, the analysis generates 191 the authoritative name based on the source that was remembered. The analysis resolves 195 the authoritative name across authoritative packages for all of the superclusters in view of the possibility of collisions among authoritative names, possibility resulting in fewer authoritative names and authoritative packages 197, 199 when colliding superclusters are merged. The authoritative name and authoritative package are identified 197, 199 for each file, and the information resulting from the correct authoritative name can be associated with the file.

It should be noted that the steps are not necessarily performed strictly in the order listed above. In an implementation, it may be desirable to perform steps in parallel or in alternate orders. For example, the hashes of file contents can be collected while clustering the hashes of identical files, and even the similar file contents can be collected and even merged into clusters, in parallel to these steps. Indeed, it may be desirable to perform some of the steps in reverse order. However, the steps will be discussed as if they occur in order to avoid obscuring the inventive aspects.

FIG. 2 is a somewhat more detailed block diagram of the concept of using change frequency to identify the authoritative package, illustrating a supercluster 241 of files with identical and incrementally changed contents, broken down into package clusters 201, 221, 231. All of the files in the supercluster 241 have identical contents, or have incrementally changed contents (as further explained below); here the files are represented by File X 2.0 (multiple copies), File X 2.1 (multiple copies), File X 2.1.2 (multiple copies), File X 2.2 (multiple copies), and File X 2.3. These files are preliminarily clustered in the same supercluster by the analysis because they are considered to be basically the same files as they have been changed from time-to-time and released in packages. The files in the supercluster 241 have been broken into package clusters 201, 221, 231; each package cluster has the same package clustered by version. Package cluster P 201 has all of the packages P 1.2, P 1.2.1, P 1.3, P 1.5, and P 1.6 203-211; package cluster Q 221 has all of the packages Q 2.2, Q 2.3, and Q 2.6 223-227; and package cluster R 231 has all of the packages R 3.0, R 3.1, R 4.1, and R 4.2 233-239. It can be seen that package cluster P 201 has 5 different package releases, and has 2 different versions of file X; package cluster Q 221 has 3 different package releases, and has 3 different versions of file X; and package cluster R 231 has 4 different package releases and has 3 different versions of file X. Each package release of package Q 221 includes a different version of file X. Packages P and R were each released several times without a new version of file X. Accordingly, the most change frequency for file X across versions is in package Q, which is identified as the authoritative package.

B. Details

1. Identify the Contents of Every File in the Ecosystem(s)—Collect the Hash of Every Javascript File Across the Various Ecosystems The purpose of this step is to be able to identify the contents of every single file in the ecosystem. Recall that the higher level problem is to observe a file, such as a Javascript file, in a packaged application and tell the user what is known about the file. The first step is to recognize all the ecosystems that are supported (or are otherwise of interested), to recognize all of the files that are in the ecosystem, and then to identify which of those files have contents which are identical to each other.

To identify file contents, it is convenient and expeditious to hash the file contents. Hashes can be performed against file contents without regard to whether the file contents are source or binary, for example. Note that identical hashes are not discarded. Note that source information indicating the source where the file originated is remembered, such as the package and/or ecosystem in which the file is located. Source information where the file originated may be included in a package in which the file was distributed.

The ecosystems which are to be included can be determined in various ways. In an implementation, there is an ongoing process of tracking the ecosystems that the system supports, for example, where software is coming from (components from existing repositories which the system then goes to and ingests). In another implementation, customers tell system where the software is from; some software is already known to the system. There may be an ongoing re-evaluation as to the ecosystems which are included, for example, the system can pull in a newly located pocket of Javascript and see how it fits into already-known information. The ecosystem can include the entire world of things are relevant. By using a large ecosystem, the unknowns can be decreased by increasing the number of knowns. The system can auto-discover repositories of its customers; techniques are known to discover the ecosystems. Most of the ecosystems include known sources with known structure, and files can be retrieved or observed using known techniques.

Accordingly, the ecosystem can include hundreds of thousands of components, and probably thousands of new ones every day. This is a Big Data problem.

In a variation, the ecosystem is limited to a specified universe of files.

2. Determine all Files which have Identical Contents—Create File Hash Clusters (FHC) for all Javascript Files, in which Each Cluster has Only Files with Identical Contents The system tries to find all of the files that have identical contents. Conventionally, the file with the same contents has been distributed across thousands of packages. The system clusters together the files which have the same identical hash, which are known to exist at certain places.

Referring to a known Javascript ecosystem as an example, there are 42,000,000 files in that ecosystem (and increasing). However, accounting for uniqueness, there are only 6,000,000 unique files which have been distributed across packages. 36,000,000 files are just duplicates of the same file throughout the entire Javascript ecosystem. The present system identifies the unique hash, and lists all of the places that unique hash (all of the identical files) exists. In this example, the system identifies 6,000,000 unique groups, each of which is a cluster of files with the same identical file contents.

Any way to identify files with the same contents may be used. Conventional hashing is convenient to use. The purpose is to identify unique files.

The system can collect all of those hashes, including information where the hash is from which is used later to answer the question regarding which one of these multiple places that the unique file came from is most likely to be the authoritative source of the unique file.

A file hash cluster, per unique file, identifies all of the places that the unique file was located in the ecosystem.

Note, in conventional identification using hashing of a file, identical files conventionally are discarded.

3. Determine all Files which have Contents which are Incrementally Changed from the Identical Files—Aggregate/Enlarge File Hash Clusters on AST Similarity The purpose of this step is to incorporate files that should be in a file hash cluster (from the previous step) because they are semantically identical or incrementally different, but are not included because they have any change from the previous file.

Consider, for example, if the difference between files is even so small as a carriage return/line feed or white space, then the hash will not be identical even though the files are semantically identical.

A convenient way to identify semantically identical files is to prepare syntax abstraction of the structure of program code in the files to be compared, or more particularly, using an AST (abstract syntax tree) according to any conventional technique. An AST is known to represent the code structure in a way which ignores most non-syntax elements. An AST can be created of all of the files, and clusters which have files with identical ASTs can be combined. Furthermore, clusters which have files with sufficiently similar ASTs can be combined. An AST can be prepared from a binary file's machine code, or bytecode, or source code. ASTs prepared from a source code and binary code version of the same file should be considered to be highly similar The file input to the AST can be normalized prior to preparing the AST, to will alleviate minor differences in the files. Techniques are known for normalizing files.

A group of files which are identical, or with sufficiently similar contents, is referred to as a "supercluster".

The intention is for the system to catch files which have almost the same contents but for some reason the contents are not exactly the same.

As an example, consider that the file jquery will have incremental modification(s) across versions. The system intends to capture all of the jquery files with those incremental modifications into one cluster because we want to capture all alike files and files with small changes, to be grouped into the same clusters. As the file jquery changes from 1.1 to 1.2 to 1.3, there is going to be enough of a structural similarity in the file contents between 1.1 and 1.2, and between 1.2 and 1.3, that the files will match (most of the time) as part of this step, which will enlarge the clusters by including such incrementally changed files in the supercluster with the identical files.

The AST is a known technique which is convenient to use to identify semantically identical and semantically similar file contents because similarity can be identified using the tree structure. For example, files with identical ASTs of their file contents can be placed in the same superstructure. In addition, the system can set a percentage of similarity of ASTs so that files with highly similar ASTs can be placed in the same superstructure.

One way to aggregate and enlarge the file hash clusters is to use AST similarity, and variations. Thus, this step can include, for each file hash cluster merge (iterative; where similarity disperses across versions):

(i). Perform FHC AST similarity comparison and merge similar FHC (ii) Perform minified AST/File inclusion and merge similar FHC (iii) Perform normalized AST inclusion and merge similar FHC Each of these is further considered below.

(i) Perform FHC AST Similarity Comparison and Merge Similar FHC

Consider an example of a first file hash cluster in which the members are identical (that is, they all have the same hash), such as JQuery 1.1.js. The system will look to the other file hash clusters to identify files which are, e.g., 95% or more similar to the first file hash cluster. This might identify a second file hash cluster with JQuery 1.2 as being 95% or more similar, and the system will incorporate the second file hash cluster into the first file hash cluster. And then the system will take the 1.2 version (the second file hash cluster) and search for similarity for that version, possibly identifying a third file hash cluster with JQuery 1.3 which is changed a little bit and is 98% similar to 1.2 and incorporate the third file hash cluster with JQuery 1.3 into the first file hash cluster. Similarity between the original file JQuery 1.1 and JQuery 1.3 version might be 80%.

The purpose is not to put consecutive versions together as such. Instead, the purpose is to find files whose contents are incrementally modified versions of 1.1. The system intends to identify 1.1, 1.1', and so on, and pull them into a supercluster. For example, assume that a user is given a canonical version and makes a slight change. And another user makes another slight change to the second version. The resulting third version may not match the canonical version but it matches the second version. The system brings the versions together into a supercluster so as to be able to create the version groups (in step #4) by pulling apart the supercluster.

Here, the system uses the clusters of files which have identical contents, and then finds files which are incrementally slightly different (using, for example, an AST to determine source files which are slightly different) and add those incrementally modified files are incorporated into the supercluster. The supercluster thus will include identically same files and incrementally different files. For example, in a situation where there are clusters A, B and C, each containing identical files, cluster BB is incrementally different from A, and cluster C is incrementally different from B. Cluster B is added to cluster A since the files of B are incrementally different from A, and then cluster C may be added to cluster A since the files of C are incrementally different from B, which creates a supercluster of A+B+C. Note that the files of C were not added originally to cluster A because C is too different from A and was only discovered via the inclusion of cluster B from which C is only incrementally different from A.

(ii) Perform Minified AST/File Inclusion and Merge Similar FHC

Minification is a technique used to shrink a total size of a file. Minification techniques are known to change a variable name which is too long into a smaller name; minification removes white space; some minification algorithms perform optimization of code. Many files are distributed in a minified form. For example, because Javascript is usually downloaded with the webpage, it is should be distributed in a very small form. When a file is delivered to a machine, the human readable version is usually minified to a very small size while achieving equivalent functionality. A regular Javascript file is not identical to the same file minified. Nevertheless, the system intends to match the minified files to the non-minified file, and pull the minified files into the supercluster.

In this system, some files in the ecosystem have already been minified. When a package is distributed, conventionally the non-minified and minified Javascript file are in the package, and the minified file is conventionally what is used in the application. So, the system has access via the ecosystem to both the minified and non-minified version of the file. When the ASTs are matched, the AST of the file probably will not match the minified version of the file.

One way to include the minified version of a file in the cluster that has a non-minified version is to search for and locate the minified version of the file based on the file name, and pull the minified version(s) into the supercluster which includes the non-minified version of the file. Note that the minification algorithm generates a well-defined minified file name pattern, e.g., with a .min extension. The end result is to pull the minified files into the appropriate supercluster.

(iii) Perform Normalized AST Inclusion and Merge Similar FHC

In an embodiment, the AST similarity and/or minification AST inclusion can be replaced by normalized AST inclusion.

Normalization can be utilized to find superclusters. The AST allows the system to ignore, e.g., white space and comments which can be ignored because they don't mean anything semantically. Other elements which are semantically irrelevant should be ignored before creating the hash.

In this variation, the AST is used to generate the hash of the file. This is another embodiment for determining what is included in the AST for generating the fingerprint.

The point is to find files which are similar so as to create superclusters by aggregating incrementally similar files (identified via minified, AST with/or without normalization).

4. For a Cluster of Identical/Incrementally Changed Files, Determine the Packages the Files Belong to, Further Break Those Packages Down by Versions, and Identify the Package with the "Most Change" Frequency for that File—Create Package Clusters from File Hash Clusters Consider a situation that supercluster has been created pursuant to the previous steps #1 to #3, and in this example supercluster there are different javascript packages, e.g., a clipper package with jquery inside of clipper; a foo package with jquery, and another package is jquery with jquery inside the jquery package, and so on. This supercluster has all of the identical and incrementally similar files across all of the different packages (in the ecosystem) in which that file occurs. For a normal ecosystem, one supercluster may have hundreds of different packages in which the identical and incrementally similar jquery file occurs.

From that supercluster which has all of the different packages, the analysis will determine which of these hundreds of different packages which have jquery inside, is the authoritative package, in this example, for jquery. In other words, the analysis intends to determine out of all of these packages with jquery in it, which is the original project that is responsible for that file, e.g., jquery.

The analysis breaks the supercluster down into all of the packages therein. For each one of these packages, the supercluster breaks the package down into versions. The analysis will determine which package in which that file has most change across those versions, which is therefore considered to be the project where that file originates.

This analysis is based on the inventor's realization that one would expect when checking in a new jquery that it is changed, which is the reason to create a new version of that file. Consequently, breaking up the supercluster into the packages and then into versions and then looking for the files most changed across each version should identify the package (and thus the project) where the file originates.

In order to break the supercluster into the packages and versions, and then determine the "most change" frequency, the following steps are taken:

4.a. Generate package names and versions for each member 4.b. Aggregate on package name to determine version count 4.c. Determine "most change" frequency across versions for each package by file Hash, and identify this as the authoritative package for that file.

Refer to the example of FIG. 3 which is representative of a jquery hash across multiple versions. Assume that the files which are identical and incrementally similar to jquery have all been pulled into the same supercluster. The analysis does not need know that these are all referred to as "jquery" and indeed similarity of name is not used in the analysis. More importantly, without further analysis it is unknown which of these packages is the original.

In a supercluster, the file names are probably not all the same, the hashes probably are not the same, and the versions will probably vary widely (as in the over-simplified example of Table 1). This overall analysis intends to determine which of these files is the authoritative file. In this step #4, the analysis looks in one supercluster for the package which has the most change across the versions; this is considered the authoritative package.

Reference is now made to the example oversimplified supercluster of Table 1. The third column is the "package name". A supercluster may include a thousand packages all of which have the identical and incrementally similar files in it. In this step #4, the analysis looks at the packages in one supercluster, puts all of the jquery packages into the same package cluster, and puts all of the Clipper packages into another package cluster, putting the webjar packages into yet another cluster, and so on, based on package name. Thus, the supercluster is broken down into package clusters, and each of the package clusters has the packages with the same package name.

The hypothesis is that the author of jquery is pushing new packages that have the jquery file, in which the jquery file ideally changes with every released package. In other words, the original author of jquery is not going to release the package with the jquery file unless the jquery file is changed. However, if a developer is merely a user of some package with jquery, the developer is not going to change the version of jquery with every release of that package; the version of jquery may be changed in some releases but not every release. So the goal of step #4 is to determine, of the packages in the supercluster, which package has the file that changes with every release of that package. This is the authoritative file, because no one but the authoritative developer of that file will be creating a new version of the file with every release. This is what the "most change" is about.

In this step, all of the identical and incrementally similar files have been grouped into a supercluster, then the supercluster is sorted out into individual packages (each, a package cluster which has packages that have the same name), each package cluster is split into the version clusters (each version cluster has only the files with all the same version within the package cluster), and then from the frequency of change of version clusters within each package cluster, the analysis can determine which package cluster is the authoritative package.

"Change frequency" refers to how frequently the file in a package is changed, in relation to how frequently the package is released. The general concept is, in an ideal situation, every time a package is released the file is a new version; therefore this package must be the authoritative source. In reality, a file is not necessarily changed in a release of the authoritative package. Consequently, the package in which the file changes most frequently in relation to package releases is in the package which is the authoritative source. Identical files in a package cluster are considered to be only one "change" which is counted once; all changes to files in the package are counted. In determining change frequency, identical package releases in a package cluster are considered to be only one "change" which is counted once; all packages releases are counted.

"Change frequency" (sometimes referred to as "frequency of change") may be implemented as a ratio of change (such as number of versions of that file in a package vs. number of package releases of that package). The highest ratio of package releases to file changes is what is looked for. It is expected that this ratio of the package which is the authoritative source is close to 100% in which each release (or almost each release) of that package has a change in that file. For consumers of the file, it is expected that the ratio is closer to 0-10%, e.g., for every 10 releases of a non-authoritative package, that package has a new jquery.

4.c.i. Example of jquery hash across multiple versions

Reference is now made to FIG. 3, which is representative of a hash across multiple versions of the same or incrementally changed file jquery. As illustrated in the simplified file listing 301, under each hash is a file which has identical contents. Note that each file is listed so as to identify where in the ecosystem the file was obtained from. The files are named according to naming conventions.

4.c.ii. Examples of frequency of change across versions

In this context, a change means a "change to the javascript file itself" When a project uses, a file such as jquery, the file jquery might be used as a dependency in which case there is no change from the original file; or it may be checked it into the source control and possibly edited (or a copyright line change, etc.) and any new character will make the hash different. This is considered a "change" to the file.

In the following example cases, the frequency of change is used to determine which package is the authoritative package. In all of the following cases, JQ should be determined to be the authoritative name of the authoritative package.

Consider the following cases a, b and c which compare frequency of change of the file jquery across versions of project JQ (which is the project in which jquery is developed) and project Foo (in which a developer merely uses jquery):

Case a. JQ: 10 versions, 10 changes & Foo: 12 versions, 10 changes

Case b. JQ: 10 versions, 10 changes & Foo: 10 version 10 changes

Case c. JQ: 10 versions, 8 changes & Foo: 10 version 10 changes

Case a is the normally expected case, in which every check-in is of a new version and in every check-in the file changes (in project JQ). There might be 12 versions of a corresponding project (here, project Foo), but jquery is not updated in every version of the corresponding project Foo; in this example jquery is updated in only two versions of the corresponding project Foo. A developer who merely uses jquery will release their project more frequently than the developer updates the file (e.g., jquery) which they are merely using.

In Case a, JQ is identified as the authoritative package.

In Case b, it just happens that the number of changes is equal in both the file and the project, so that both have the same highest frequency of change. In this situation, the system can use the file name to resolve which project is authoritative. Alternatively, the file can be forward for human review to resolve which project is authoritative.

Case c is a hypothetical case which is speculated must exist which causes the incorrect result. In Case c, there are more changes in what would be the incorrect project; causing the system to incorrectly identify the authoritative package. This might happen if, for example, in every check-in the developer of Foo adds their initials to the file, thereby creating a change for every single file in Foo. In this hypothetical scenario, the system will identify the wrong project (Foo) as being the original project. The system can resolve some of these errors by making sure that the ecosystem is correct, e.g., fee can default to the javascript ecosystem. Another possibility is that ecosystems might be assigned in pre-determined priority. For example, it is unlikely that a javascript developer would release via NuGet, and so a file of type javascript which identifies a nugget package as the authoritative project will be indicated as incorrect and needing further resolution.

In Case c, Foo is identified as being the authoritative project, which is known to be incorrect because it is in the wrong ecosystem for a javascript-type file. Because Foo is the wrong system, the result can be forwarded for human review.

In a variation, to resolve package inclusion, node modules should not participate in the frequency count.

5. Pull any Outlying Files Back into the Package Version Group in which they Belong—Create Package Version Groups from the Package Cluster Based on Authoritative Package Versions Once we have identified the authoritative package, we need to move all of the other files into their correct version slot. From the supercluster and the frequency of change across versions, the analysis in the above Case A has authoritatively determined that JQ is the authoritative package. We have these other files that are in the supercluster but are not in the JQ package, such as listed in Table 1 and Table 2, namely, Clipper, Webjar, and NuGet. These package clusters are all in the same supercluster, but each package cluster should be assigned to a package version group, so as to authoritatively indicate that a (in the package cluster) file is most similar to an authoritatively named file, e.g., JQuery 1.1. Step #5 is intended to pull in the outlying authoritative packages in the version cluster into the authoritative package version group.

This can be done by:
a. Merging authoritative package outliers into authoritative package version groups; and
b. Merging minified outliers based on file name and not AST As an example, consider the simplified example in Table 1, which has 6 packages all with JQ. There are six files in this simplified supercluster, and assume that JQ has been determined as the authoritative package. Now, doing an AST similarity comparison, the analysis finds that Clipper version 4.5 is most similar to Pkg 1 version 1.1, so it is assigned to the version 1.1 version cluster as shown in Table 2. When we see that clipper 4.5 inside an application, we can give it the data from the project being jquery 1.1. This step is about, how do the outliers get moved into the package version groups.

This happens in two ways. The non-minified files are optionally normalized and merged based on AST. The minified files can be merged based on file name and not on AST similarity.

TABLE 1

Supercluster of 6 package clusters all with file JQ

| | Package version | Package name |
|---|---|---|
| Pkg 1 | 1.1 | JQ |
| Pkg 2 | 1.2 | JQ |
| Pkg 3 | 1.3 | JQ |
| Pkg N | 4.5 | Clipper |
| Pkg X | 1.1.1 | Webjar/JQ |
| Pkg Z | 1.4 | NuGet/JQ |

TABLE 2

Versions Clusters Based on JQ Being Authoritative Package

| Authoritative Package | Package Name and Version | Package Name and Version | Package Name and Version |
|---|---|---|---|
| JQ 1.1 | Pkg 1 1.1 | Clipper 4.5 | Pkg Y 1.4 |
| JQ 1.2 | Pkg 2 1.2 | | |
| JQ 1.3 | Pkg 3 1.3 | Pkg Z | |

Collision resolution when assigning the outlying files may be handled. It is possible that the file did not change from 1.1 to 1.2, such as when a new release is created due to some other file in the package. If that is the case, then Clipper 4.5 might match both 1.1 and 1.2 in Table 2. The analysis can arbitrarily resolve the collision by assigning Clipper 4.5 to the earlier ("introduction") version. Accordingly, the analysis can resolve version collisions to introduction version.

6. Resolve Authoritative Name Collisions Among the Clusters of Files—Generate AName from Authoritative Package Version Groups At this step, the analysis has all of the superclusters, and each supercluster has been assigned an authoritative name and an authoritative versions. Referring back to the examples of Tables 1 and 2, perhaps jquery versions 1.1 and 1.2 were in the same supercluster but jquery 1.3 was in another supercluster because it was a major rewrite and thus insufficiently similar to be identified as an incremental change. In that situation, the authoritative name for the supercluster which includes jquery 1.1 is going to be "jquery" and the authoritative name for the supercluster which includes jquery 1.3 is also going to be "jquery." There is an authoritative name collision, which should be resolved. Because of the way that we generate the authoritative package name itself, we know that if a collision occurs, they came from the same package structure.

This step includes the following:
a. Use the authoritative package to generate the AName name
b. Use the authoritative package versions to generate AName_versions
c. Each member of the authoritative package version groups receives AName_(name, version)
d. Collision Resolution
  i. When the AName_name collides and the version does not collide
    1. Create a new version in the authoritative package versions
  ii. When AName_name collides and the version collides
    1. Merge clusters For example, if the AName is jquery for 1.1 and 1.2, and the AName is jquery for 1.3, the only way that those names could match is if the package format for 1.1, 1.2 and 1.3 is exactly the same. Accordingly, those two superclusters should be (and are) merged together. So in the case where we have a jquery 1.1 and 1.2 in one cluster and jquery 1.3 in another cluster, we need to merge those two superclusters to add the 1.3 version to the 1.1 and 1.2 versions.

In this example as explained above, jquery 1.3 was originally in a different supercluster. At the end of the day, we independently calculated that the ANames of two different superclusters are the same. This in effect realizes that 1.3 should have been in the same supercluster. The change between 1.2 and 1.3 was so significant that they didn't get merged into the same superclusters. This step addresses the problem that a change may be so significant that the relationship between the files was not previously realized.

This step recognizes that the analysis might not make the correct superclusters at step 1. Step 2 has localization files or ancillary files that are not going to change from version to version to version, and they will end up in a supercluster with one file. In this step #6, this analysis finds that the authoritative name of one superclusters collides with the name from another supercluster. These superclusters will be merged into the appropriate authoritative name. The analysis can include the information from those files as well.

Consider that a particular package has file1 and file2, which are not similar at all and just perform different functions in the package. When the files are associated to an AName, we want the AName of both files to be the same as well as having the version resolution. By combining the ANames at the end, the analysis collapses file1 and file 2 under the same AName.

The point of creating the supercluster is to pull in version history as well as to pull in other modifications in other packages. The point of this last step is to merge all of the ancillary files inside that package back together under the AName. The local additional files are another example, which should be under the AName.

The version assignments happen before they are collapsed. So when collapsed, they already have the versions assigned.

In another embodiment, step 6 might occur before step 5.

In the worst case scenario the outlier files might not match the version and might not have a AName and might need human review.

C. Flow Diagram

Reference is now made to FIG. 4, an overall flow chart illustrating a procedure for authoritative name analysis. The flow chart of FIG. 4 encompasses the flow discussed above.

By way of review, the follow features were discussed above:

Step 1, Step 2. Collect unique identifiers of files into clusters to create hash clusters, each hash cluster contains identical files (and indicates their sources). In the example of FIG. 4, at step 401, the analysis creates file hash clusters based on identical hash matches. At step 403, the analysis generates an AST fingerprint for each hash cluster.

Step 3. Include, to create superclusters, of similar files so as to capture incremental changes over time. In the example of FIG. 4, at step 405, the analysis aggregates and enlarges file hash clusters based on AST similarity. At step 407, the analysis performs the previous operation until the outlier set is exhausted. At step 409, the analysis pulls in outlier files (for example, outlier js files) where the AST fingerprints and the files' ASTs are a sufficiently good match. At step 411, for each member of the outlier set, the analysis measures AST similarity between the candidate file's AST and all hash cluster ASTs. At step 413, the analysis performs the previous operation until the outlier set is exhausted.

Step 4. Break supercluster down into package clusters. Within each of the superclusters, discover which package cluster within a supercluster is the "most changed", which is the authoritative package. In the example of FIG. 4, at step 415, at this point we have a set of populated FHCs where the members are js files that are either identical or similar based on AST matches. At step 417, the analysis creates package clusters from the file hash clusters.

Step 5. Create package version groups from the authoritative packages and merge in outliers into packages. At step 419, for each version within an authoritative package group within a package cluster, the analysis evaluates AST similarity distances to other files that belong to low variance package groups within the same package cluster. Then, at step 421, the analysis identifies the authoritative package. At step 423, the analysis evaluates packages within each package cluster and identifies patterns where version variances within the same package are relatively higher than version variances of other packages. At step 425, the analysis assigns the version to each file that belongs to a lower version variant package, for example, propagate the version number from the most similar file in the high version variant package group.

Step 6. Generate authoritative name from authoritative package version groups and resolving collisions of authoritative names across the different superclusters (merging the superclusters which resolve into the same authoritative name). In the example of FIG. 4, at step 427, the analysis resolves A-name collisions.

As a result, the authoritative package version and source of the file is identified. Subsequently, post-identification processing can be performed using that information, for example, to associate that information based on the authoritative package version and source to other files that are resolved to the same authoritative package group. In the example of FIG. 4, at step 429, post-identification processing can assign the project URL, and/or license information and/or metadata information from the high version variant package group to all other members of the same package cluster. For example, in a package in which a developer merely uses a variation of jquery, after analysis that variation of jquery is associated with the license information and metadata information from the authoritative package version and source from the originator of jquery.

V. Additional Example Implementations

This section will discuss additional concrete examples of implementation, which are well suited to demonstrate various implementation details.

Figure 5:
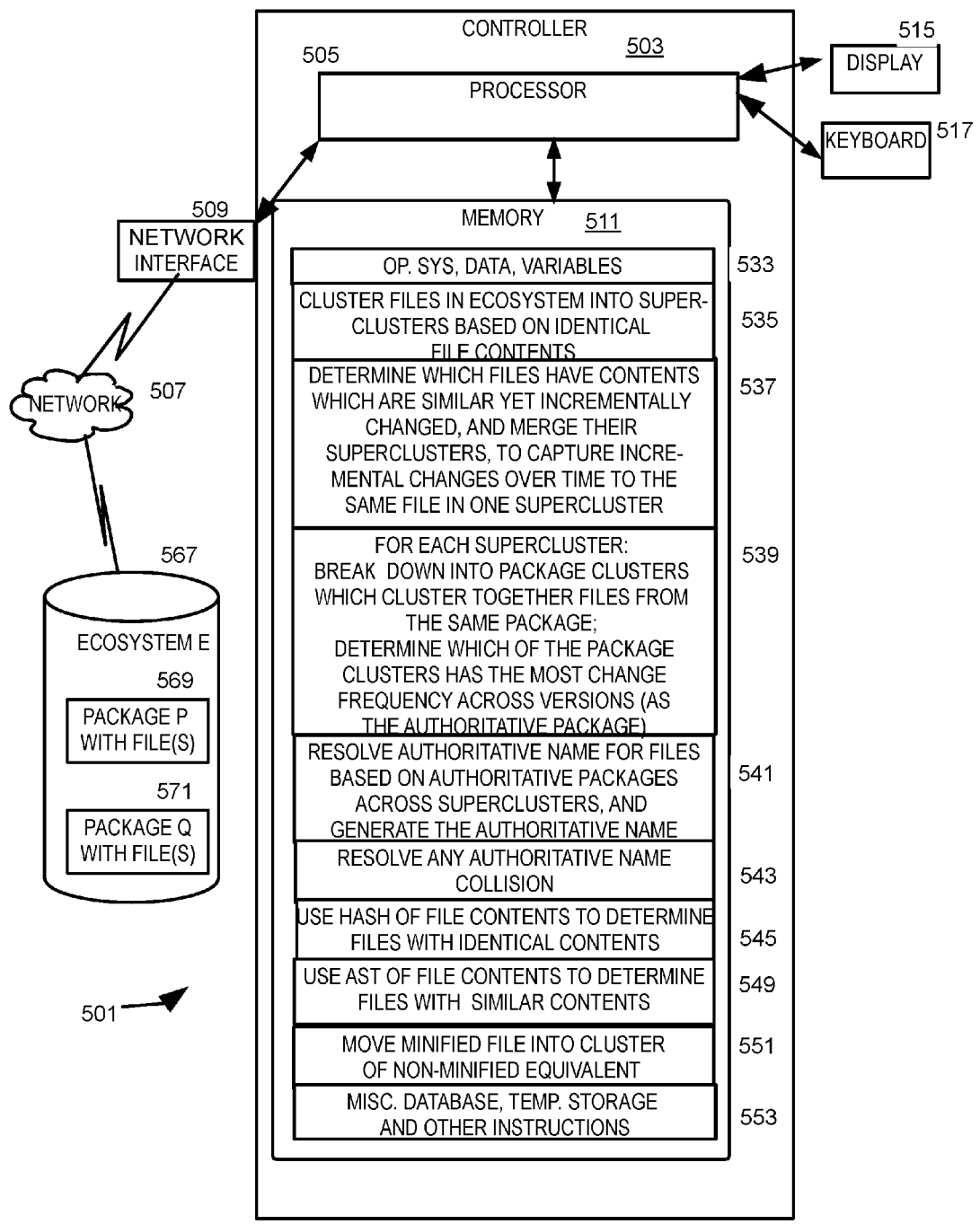
FIG. 5 is a block diagram illustrating relevant portions of a computer system.

FIG. 5 illustrates a computer system implementation. The procedure of FIG. 6 to FIG. 8 conveniently may be implemented on the computer system of FIG. 5, or any another apparatus which is appropriately configured and arranged.

Referring now to FIG. 5, a block diagram illustrating relevant portions of a computer system 501 will be discussed and described. A computer system 501 may include one or more controllers 503, a processor 505, an network interface 509 for communication such as with a network 507, a memory 511, a display 515 (optional), and/or a user input device such as a keyboard 517. Alternatively, or in addition to the keyboard 517, a user input device may comprise one or more of various known input devices, such as a pointing device, a keypad, a computer mouse, a touchpad, a touch screen, a trackball, and/or a keyboard. The display 515 is representative of a display that may present information to the user by way of a conventional liquid crystal display (LCD) or other visual display, and/or by way of a conventional audible device (e.g., a speaker) for playing out audible messages. Portions of the computer system 501 are well understood to those of skill in this area and have been omitted to avoid obscuring the discussion.

The processor 505 may comprise one or more microprocessors and/or one or more digital signal processors. The memory 511 may be coupled to the processor 505 and may comprise a read-only memory (ROM), a random-access memory (RAM), a programmable ROM (PROM), and/or an electrically erasable read-only memory (EEPROM). The memory 511 may include multiple memory locations for storing, among other things, an operating system, data and variables 533 for programs executed by the processor 505; such programs can include one or more of the following: to cluster 535 files in the ecosystem into superclusters based on identical file contents; determine 537 which files have contents which are similar yet incrementally changed, and merge their superclusters, to capture incremental changes over time to the same file in one supercluster; for each supercluster 539: break down into package clusters which cluster together files from the same package, determine which of the package clusters has the most change frequency across versions (as the authoritative package); resolve 541 authoritative name for files based on authoritative packages across superclusters, and generate the authoritative name;

resolve 543 any authoritative name collision; use 545 a hash of file contents to determine files with identical contents; use 549 an AST of file contents to determine files with similar contents; move 551 a minified file into a cluster of the non-minified equivalent; and a database 553 for other information and/or instructions used by the processor 505. The computer programs may be stored, for example, in ROM or PROM and may direct the processor 505 in controlling the operation of the computer system 1001. Each of these functions is considered in more detail herein, to the extent that it is not detailed elsewhere in this document.

Responsive to manual signaling from the user input device represented by the keyboard 517, in accordance with instructions stored in memory 511, and/or automatically upon receipt of certain information via the network interface 509, the processor 505 may direct the execution of the stored programs.

The computer system 501 can access one or more ecosystems, here represented by ecosystem E 567 on which is stored one or more files, probably stored in connection with packages, here represented by package P and package Q 569, 571. Although the files are illustrated as accessed over the network interface 509, the files 569, 571 may be remotely and/or locally accessible from the computer system 501, over a wired and/or wireless connection. The illustrated architectural environment for this runs into the cloud, represented by network 507. The files and packages 569, 571 do not need to be limited to a database or a software repository 567. The software repositories conventionally have well formatted descriptions of contents, and the computer system 501 herein can be adapted to software repositories in the cloud. Note that the computer system 501 can be distributed over multiple computers. Techniques are known for accessing files and packages and information regarding the packages and versions, which may be located in a software repository 567; packages also are commonly known to include package identifying information.

Much of the details of the programs have been discussed above, and the following is provided to expand understanding without necessarily repeating what is discussed above, and to possibly explore variations.

The processor 505 may be programmed to cluster 535 files in the ecosystem into superclusters based on identical file contents; determine which files have contents which are similar yet incrementally changed, and merge their superclusters, which is intended to capture incremental changes over time to the same file in one supercluster. The ecosystem can be preliminarily identified as being one or more of the following, by way of example: those ecosystems which the computer system is aware of, and/or those ecosystems which have been identified to the computer system, a pre-identified subset of one or more of the foregoing, and variations thereof. Note that the determination about whether the files are identical is based on file contents, possibly using conventional techniques. A simple method to determine which files have identical contents is to create hashes of file contents; files having identical hashes have identical contents. Any minor change to file contents, even a change which has no semantic significance (such as a comment), will result in a different hash. A simple method to determine which files have semantically identical contents uses AST, for which various techniques are available. Also, techniques are known for comparing AST trees to determine whether source code is identical (for example, by omitting semantically insignificant characters from an AST) or similar (for example, by defining how much of the AST trees should be identical). The intention is to capture the idea that differences between a file which is released in a first version and a second version of that same file (in a package) are due to incremental changes, and furthermore that such files (in a package) which have been incrementally changed should be grouped together to determine whether the package in which the file was found is released as frequently as the file is released. In addition, techniques may be used to normalize file contents prior to preparing a hash or AST. Techniques will be known to those of skill in the art for determining whether file contents are semantically identical or semantically similar. In this instance, it is desirable for the computer system to retain identifying information regarding where the file is located in the ecosystem 567, for example, a package 569, 571 where the file was located. Thus, the system can include an indication of a source within the ecosystem for each of the files in the supercluster; the indication of the source within the ecosystem can be used later to retrieve additional information from the authoritative package (based on the indication of the source within the ecosystem of the file) regarding the authoritative file. Information regarding the superclusters, the files which are clustered together into superclusters, and the information used to determine whether the files are identical/similar (e.g., file hash and file AST), package clusters, and so on, can be stored, e.g., temporarily, e.g., in storage 553. As further discussed herein, note that some superclusters may be merged together (sometimes also referred to as being aggregated) for further processing, such as when the analysis determines that files in superclusters belong in the same supercluster. Note that there may be a very large amount of data which is processed, and accordingly, distributed processing across multiple processors 505 and/or storage in the cloud may be contemplated by some implementations.

The processor 505 may be programmed to perform the following, for each supercluster 539 determined to be identical or incrementally changed: break down into package clusters which cluster together files from the same package, determine which of the package clusters has the most change frequency across versions (as the authoritative package). This has been discussed in detail elsewhere. The intention is to determine all of the packages (each, a package cluster) in which the file has been released; and to determine how many versions of the file exist within each of the packages. The breakdown can be based on the indication of source within the ecosystem of each file, or other identification of a package to which each file belongs. Then, the frequency of changing the version of the file vs. the frequency of changing the version of the package is determined. Ideally, in the authoritative package, a file's version changes with every version of the package. As discussed elsewhere, the analysis can be adapted to determine whether a file which is non-identical (and thus appears be a different version), is actually no more than adding comments, or inserting initials, to a semantically identical file, for example. In this sense, a "version" refers not to a canonical version of a file, but version which is a variation of the file and which might (or might not) have been a canonical version as released.

The processor 505 may be programmed to resolve 541 the authoritative name for files based on authoritative packages across superclusters, and generate the authoritative name. This has been discussed in detail above.

The processor 505 may be programmed to resolve 543 any authoritative name collision. This also is discussed in detail above The processor 505 may be programmed to use 545 a hash of file contents to determine files with identical contents. Various techniques are known to prepare a hash of file contents. A comparison of such hashes of file contents may be made to determine whether files have identical contents.

The processor 505 may be programmed to use 549 an AST of file contents to determine files with similar contents. Techniques are conventionally available to prepare an AST of file contents. Techniques are known to determine whether AST trees of file contents are identical, and/or whether AST trees of file contents are sufficiently similar (for example, given a pre-determined threshold). Techniques are known to normalize file contents (for example, to remove comments, white content, and the like) prior to or subsequent to preparing an AST tree of file contents.

The processor 505 may be programmed to move 551 a minified file into a cluster of the non-minified equivalent file. Any conventional technique may be used to identify a minified file and the non-minified equivalent, for example, association in a download package, or starting with a non-minified equivalent from which a minified file is prepared according to conventional techniques. A minified file and its non-minified equivalent file are intended to be treated as if they are the same version, and thus may be included in the same supercluster and package cluster.

The memory 511 also can include other miscellaneous information in a misc. database 1057, along with the usual temporary storage and other instructions for other programs not considered herein.

The computer system 501 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which can be interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. In some embodiments, the computer system 501 can access a virtualized infrastructure commonly referred to as a "cloud" or "cloud storage." The processor 505, memory 511, a disk drive, removable storage medium, and/or cloud storage are referred to as "computer-readable storage media" and provide non-transitory storage of computer programs and data.

It should be understood that FIG. 5 is described in connection with logical groupings of functions or resources. One or more of these logical groupings may be omitted from one or more embodiments. For example, an embodiment may omit the resolution of authoritative name collision, or an embodiment may use a method other than hashing to determine identical file contents, or an embodiment may use a method other than AST to determine similar file contents, and so on. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely and/or in a virtualized infrastructure commonly referred to as a "cloud" without departing from the scope.

Figure 6:
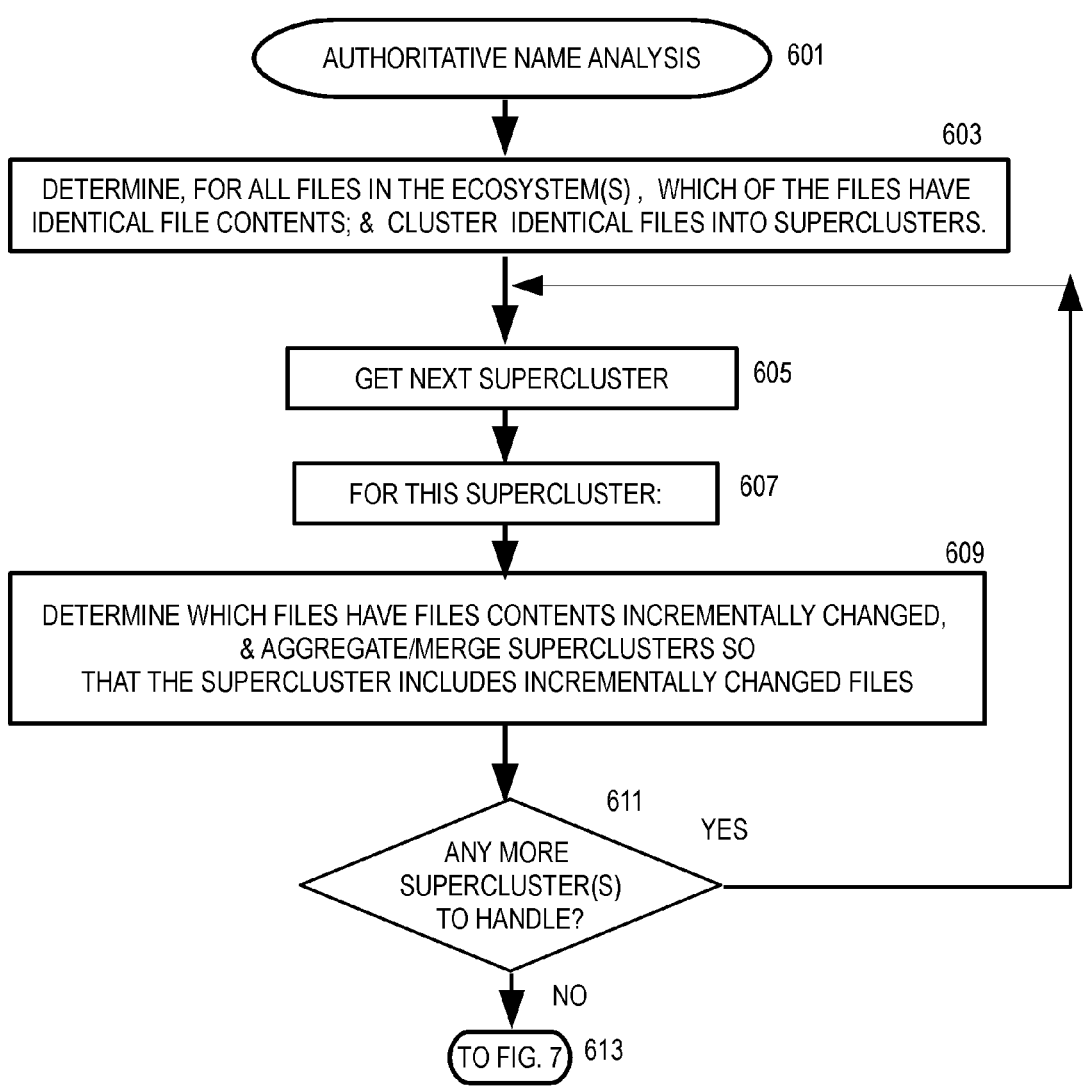
FIG. 6 to FIG. 8 collectively are a flow chart illustrating a procedure to provide an authoritative name analysis.
Figure 7:
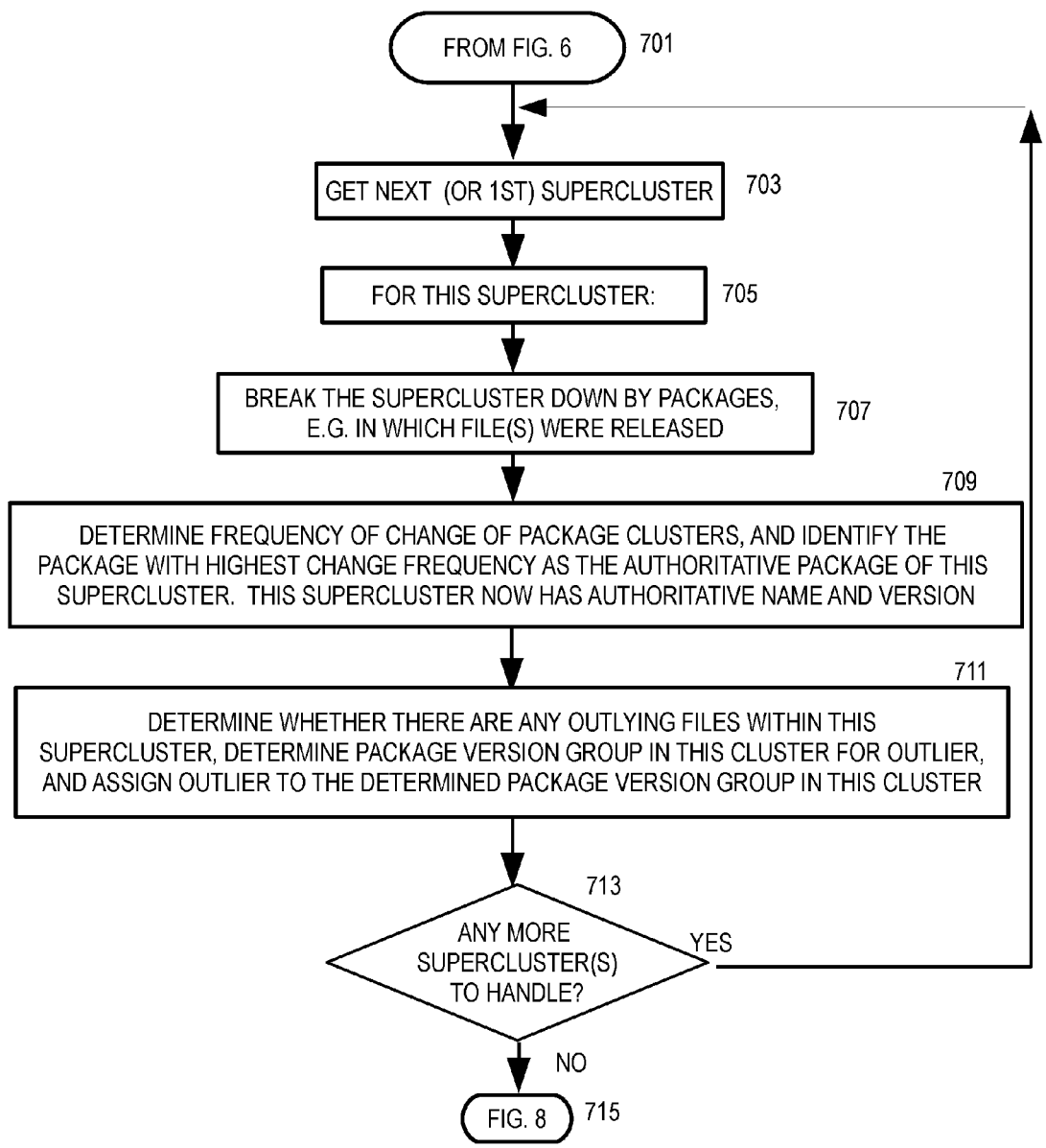
Figure 8:
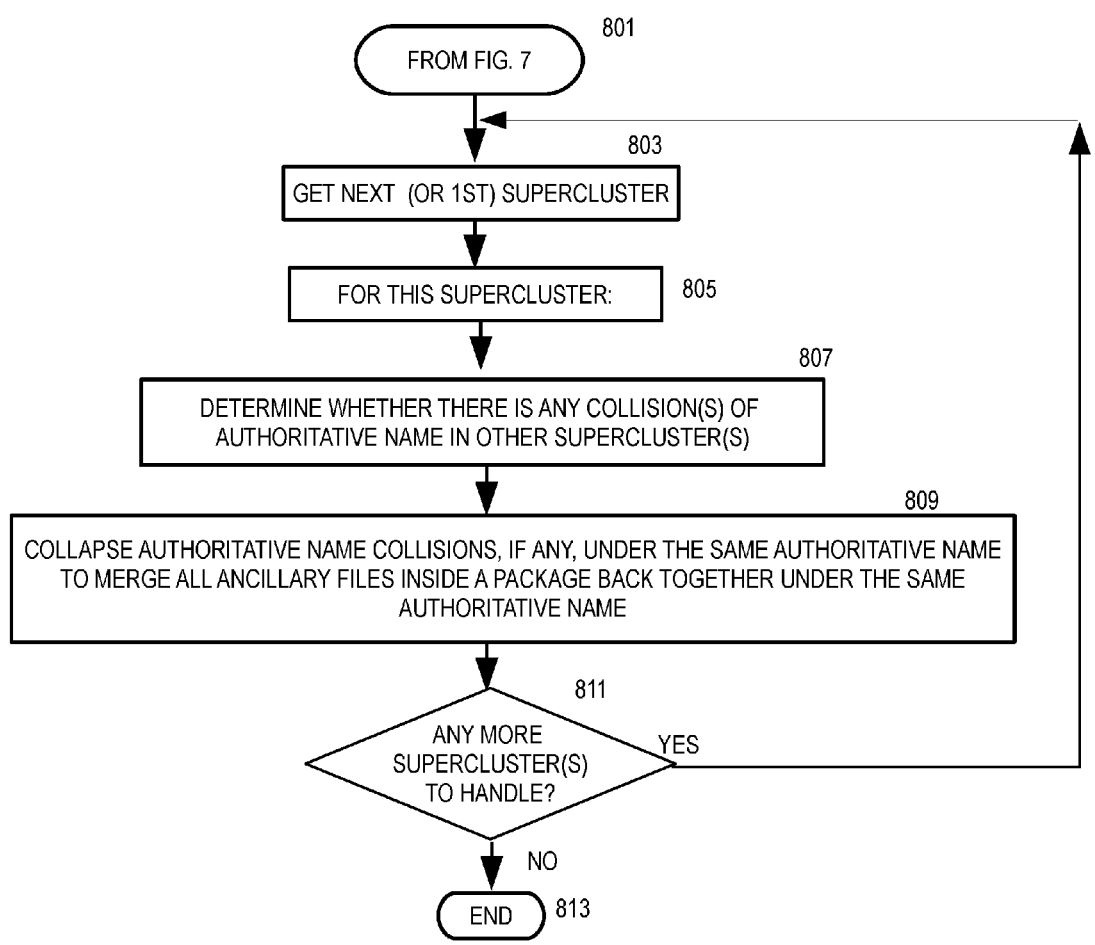

FIG. 6 to FIG. 8 collectively are a flow chart illustrating a procedure to provide an authoritative name analysis. The procedure can conveniently be implemented on a computer system, such as illustrated in FIG. 5, or other computer system appropriately arranged.

The procedure for authoritative name analysis 601 will determine 603, for all files in the ecosystem(s), which of the files have identical file contents, and will cluster identical files into superclusters. It is anticipated that the contents of such files are components, for example, including source code. Accordingly, the procedure 601 has prepared superclusters so that the files in each supercluster of the plurality of superclusters have identical contents.

The procedure 601 will get 605 get the first supercluster or the next supercluster. For this supercluster 607, the procedure will determine 609 which of the other superclusters have files which, in comparison to the file in the present supercluster, have file contents which is incrementally changed; and if one of the other superclusters has files with files contents that is incrementally changed in comparison to the files in the present supercluster, both the present supercluster and the one of the other superclusters will be merged, so that there is one supercluster which includes the identical files and the files which were incrementally changed. The procedure repeats 611 until all of the superclusters have been handled. There may be fewer superclusters after performing this step 609. Accordingly, the procedure 601 has prepared superclusters so that the files in each supercluster of the plurality of superclusters have identical and incrementally changed filed contents. Consequently, the procedure has determined, of the files in the ecosystem which are clustered into the plurality of superclusters, which of the files have similar contents to each other, and merged the files which have similar contents to each other into the same supercluster, to capture possibly incremental changes to the files over time in one of the superclusters which has the files with identical contents and similar contents.

FIG. 6 then proceeds 613 to FIG. 7 at 701.

Then the procedure 601 will break each supercluster down into package clusters, and determine which of the package clusters has the most change frequency across versions, as the authoritative package. In more detail, the procedure 601 gets 703 the first (or next) supercluster. For this supercluster 705, the following are performed. The procedure breaks 707 the supercluster down by packages, where files were released in a package. Accordingly, each supercluster is broken down into package clusters, based on packages to which the files belong, each of the package clusters has the files from a same package. Then, the procedure determines 709 the frequency of change for each of the package clusters, and identifies the package with the highest change frequency which the procedure considers to be the authoritative package of this superclusters. Frequency of change is described herein elsewhere in more detail. This supercluster now has an authoritative name and version for its file. This is repeated 713 so long as there is another supercluster to handle. Accordingly, for each of the superclusters, the procedure has determined which of the package clusters has the most change frequency across versions as the authoritative package.

FIG. 7 then proceeds 715 to FIG. 8 at 801.

Then the procedure 601 will get 803 the first (or next) supercluster. For this supercluster 805, the procedure 601 will determine 807 whether there is any authoritative name collision, for example, where a version of a file was so substantial than it was not included in a same supercluster with other versions of the same file, and will collapse 809 authoritative name collisions to merge ancillary files inside a package back together under the same authoritative name. The procedure 601 will handle all of the superclusters 811 in the same way. At the end of this sequence, there may be fewer superclusters than at the beginning of this sequence, due to authoritative name collisions. Consequently, the procedure 601 has resolve an authoritative name for the files, based on the authoritative packages that are determined, across the plurality of superclusters which have files with identical and similar contents, and generated the authoritative name; and has resolved any authoritative name collisions.

In operation of such an authoritative name analysis, the authoritative name and authoritative package of the file have been determined with much greater accuracy than conventional systems. That is, the original name of a file which appears in different packages is correctly identified, in combination with the original package which originated that component. Accordingly, visibility and understanding of packages and the software components has been greatly improved, despite the possibility that the ecosystem has numerous files which are essentially the same but with minor variations in content and/or name, and despite the likelihood that many of these components might have originated elsewhere, possibly not even in the ecosystem. Use of such correct information in post-identified processing will be appreciated, such as assigning license information and/or metadata information to all members of the same package cluster.

VI. Glossary

Terms as used herein are intended to be interpreted first, as understood to one of skill in the art at a first level, of software repositories; and if not interpretable at the first level, than at a second level as understood by one skilled in the science of tools that support and manage software development; and if not interpretable at the first level and second level, then at a third level as understood to one of skill in the art of computer science; and then if not interpretable according to the first, second and third levels, according to a general dictionary.

The claims may use the following terms (with or without capitalization), which are defined to have the following meanings for the purpose of the claims herein. Other definitions may be specified in this document.

The designation "File Hash Cluster" (sometimes referred to as FHC), when used in a claim, is defined as a collection of plural files where the contents of all of the files, as determined from hashes of the contents of the files, are identical. Techniques are available for creating a hash, including a hash of contents of a file.

The designation "Abstract Syntax Tree" (sometimes referred to as AST) is defined as a representation of the abstract syntactic structure of source code written in a programming language, wherein the nodes of the tree each denote a construct occurring in the source code. Techniques are available for creating an abstract syntax tree from source code.

The designation "Package Cluster" is defined herein as a collection of files, all of which are from the same file hash cluster (and therefore have identical contents), and file hash clusters which have files which are determined to be incrementally different from those in the same file hash cluster, in which the collection of files in the package cluster all have the same package name.

The designation "package" as used herein is defined as a container (which is a file or a folder) that bundles together components intended for use by a particular application, and/or to assist in installing and/or de-installing, and/or running the particular application, and/or which are used by the particular software application and/or which are used in a build of the particular software application; the package also includes manifest data which identify the package and which uniquely identify the constituent files that enable the package to function. By way of explanation and not definition, the package may contain, as a non-limiting example, one or more of the following: content needed to reference an external library, source code, binaries, executable files, classes, interfaces, scripts, documentation, components used during installation, components used for running the particular application itself, other packages, components and/or related items. The manifest metadata in a package generally indicates the following or similar: the software's name, description of its purpose, version number, vendor, integrity information such as a checksum, and an enumerated list of dependencies on other components necessary for the software to run properly. Package managers which consume packages include, by way of example, package managers sold under the trademarks and/or tradenames NuGet, Node Package Manager, PyPi, RubyGems, PHP Composer, Android, Alpine Linux, Windows 8 and later, Windows Phone, Debian and its derivatives, Gentoo Linux, ORB Launcher, Pardus, OSDX, iOX, PlaysStation 3, Solaris, SunOS, UNIX System V, Symbian, BeOS, Apple Netwon, Puppy Linux, Red Hat Enterprise Linux, Fedora and its derivatives, Ubuntu, Slitaz, Tiny Core Linux, Ach Linux's Pacman, Slackware, and evolutions and extensions thereof. Formats of packages have internal structures and file name extensions consistent with one or more package formats defined under the trademarks or trademarks of, for example, APK, APPX, APPXBundle, Deb, ebuild, ORB, PISI, PKG, PUP, PET, RPM, SNAP, TAZPKG, TCZ, Tar archives, and evolutions and extensions thereof.

The designation "Package Version Cluster" is defined herein as a collection of files, all of which are from the same package, in which the collection of files all have the same version number.

The designation "Authoritative Package" as used herein is defined as the package, in a package version cluster, that has the most change across versions.

The designation "Authoritative Name" as used herein refers to the name and version that represents the project responsible for the package creation and maintenance of the authoritative package.

The designation "Collision Resolution" refers to an algorithmic choice to determine direction when two items resolve to the same thing due to similar data.

The designation "minification" or "minifying" refers to a process of removing unnecessary characters from source code without changing the functionality of the source code; the unnecessary characters may include, by way of example, one or more of white space characters, new line characters, comments, and/or block delimiters, and similar characters, all of which are not required for the code to execute, but which typically are intended to add readability to the code.

The designation "minified" refers to code which resulted from minification of source code.

By way of explanation and not definition, an AST of minified source code typically is different from an AST of the same source code which is not minified.

The designation "normalized AST" or "normalized Abstract Syntax Tree" refers to an AST in which the name and/or structure variants within the source code have been removed or replaced to allow comparison of functionally equivalent source code. Techniques are known to create a normalized AST, which can be created from code which has been normalized, and/or by normalizing the AST itself.

The term "byte code" as used herein is defined to mean an intermediate operational code which was generated by translating an input programming language, and then the byte code can be interpreted at the time the byte code is executed by the virtual machine which has its own instruction set independent of the native machine code for the hardware on which the virtual machine executes. Examples of computer languages which use "byte code" include, without limitation, Java, .NET, Scala, jython, groovy, and Pascal The term "component" used herein is defined to be a specific version (which may be a canonical version) of pre-existing software, or a reusable pre-existing self-contained software code building block which is not a complete stand-alone finished product ready for use, which is source code, software or run-time executable code; a component can comprise one or more nested components within the component itself; a component can be the subject of a risk such as a license or a target of a security vulnerability.

By way of explanation and not as a definition, a component which is part of a stand-alone product can be understood to be a self-contained bit of code which a developer does not wish to write himself/herself as part of the stand-alone product, and so the developer uses a previously existing component for which the functionality likely was previously vetted as a part of another stand-alone product. As a non-limiting example of components which are nested, a Java web application packaged as a WAR component might contain various JAR components and JavaScript libraries, each of which is a component themselves.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

"Open source" software is defined herein to be source code that allows distribution as source code as well as compiled form and/or binary form, with a well-publicized and indexed means of obtaining the source, optionally with a license that allows modifications and derived works.

The term "repository" or "software repository" used herein are defined to mean an electronic storage system that stores components (sometimes referred to as an "artifact") and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository typically has a unique identifier that indicates the software developer (an individual or a group) that contributed the artifact.

By way of explanation and not definition, a repository can be remote or local; some embodiments of a repository might be stored in a virtualized infrastructure commonly referred to as a "cloud." Examples of conventional software repositories include, by way of example but without limitation: the Central Repository (also known as Maven Central), the NuGet Gallery, RubyGems.org, npmjs.org, and many others. Repositories tend to rely on pre-defined formats and tools, for example, the Maven repository format, REST API interactions, different directory structures with format specific files for metadata, and the like. Software repositories are accessed by tools, including by way of example but without limitation: build tools such as Maven, Gradle, rake, grunt, and others; package managers such as npm, nugget, gem, and others; Integrated Development Environments such as Eclipse, IntelliJ, and many others.

The term "software build" used herein specifically is defined to mean a process as pre-defined in an executable build program of converting a plurality of components (some or all of which may be obtained from a repository) and combining the results into an executable stand-alone computer program or a software component for use in a further software build, including at least compiling components and linking compiled components and possibly binary components (which can be from the repository), in a pre-determined order as defined in the build program.

The term "compiler" is used herein specifically to mean a computer program(s) that transforms source code written in a programming language into a target language that is readable by a computer, often in the form of binary code or bytecode, so as to create an executable program.

The phrase "automatically without manual intervention," when used in a claim, is defined to mean that the particular step occurs after the step is initiated until limitations recited in the step are finished without requiring a user to provide input to a processor.

VII. Implementation and Technical Notes

The above discussion has assumed that the reader has a sufficient technical background for appreciating the points made. This section provides some supplementary implementation and/or technical notes which discuss some technical information that may be relevant.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for providing an authoritative name analysis have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is used by a single developer or administrator at a single site. An embodiment may be used by numerous developers, administrators and/or related users, if preferred, at one or more sites.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding, determining, or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/ or utilize wireline connections such as cable and/or a connector, or similar. Any appropriate communication protocol may be used.

The computer and/or system embodied in connection herewith may (or may not) rely on the integration of various elements including, as appropriate and/or if desired, by way of example but not limitation, hardware and software servers, applications software, database engines, server area networks, conventional firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format, using XML. Although HTML, and XML, may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for providing an authoritative name source for files within an ecosystem, comprising the following performed by at least one processor:

clustering the files in the ecosystem into a plurality of superclusters, in which the files in each supercluster of the plurality of superclusters have identical contents; then determining, of the files in the ecosystem which are clustered into the plurality of superclusters, which of the files have similar contents to each other, and merging the files which have similar contents to each other into the same supercluster, to capture possibly incremental changes to the files over time in one of the superclusters which has the files with identical contents and similar contents;

for each supercluster which has the files with identical and similar contents:

breaking the each supercluster down into package clusters, based on packages to which the files belong, each of the package clusters has the files from a same package; and determining which of the package clusters has most change frequency across versions of the files within the same package, as the authoritative package, wherein change frequency refers to how frequently the version is changed in relation to how frequently the package is released; then resolving an authoritative name for the files, based on the authoritative packages that are determined, across the plurality of superclusters which have files with identical and similar contents, and generating the authoritative name; and resolving any authoritative name collision.

2. The method of claim 1, wherein a hash of file contents of each of the plurality of files is used to determine which of the files have identical contents, the clustering of the files in the superclusters with identical contents is determined based on the hashes of file contents, for the each supercluster, the each supercluster includes an indication of a source within the ecosystem for each file of the files, the breaking down into the package clusters is based on the indication of the source of the each file.

3. The method of claim 1, wherein an abstract syntax tree of file contents of each of the plurality of files is used to determine whether contents of files are similar, the determining of files with similar contents into the same supercluster is based on the abstract syntax tree of file contents, for the each supercluster, the each supercluster includes an indication of a source within the ecosystem for each file of the files.

4. The method of claim 1, wherein breaking each supercluster down into package clusters includes generating package names and versions for members of the supercluster, aggregating package clusters on package name and counting unique changes to the package cluster, and determining, for each package cluster, the most change frequency among the package clusters.

5. The method of claim 1, wherein the authoritative name is resolved by merging authoritative package outliers into groups which are merged into package cluster based on file name, the resolved authoritative name and source are identified.

6. The method of claim 1, further comprising determining whether the authoritative name source is correct based on ecosystem in which authoritative name source originated.

7. The method of claim 1, wherein the ecosystem, in which the files are located which are clustered, includes at least one software repository in which the files are located.

8. A non-transitory computer readable medium comprising instructions for execution by a computer, the instructions including a computer-implemented method for providing an authoritative name source for files within an ecosystem, the instructions for implementing:

clustering the files in the ecosystem into a plurality of superclusters, in which the files in each supercluster of the plurality of superclusters have identical contents; then determining, of the files in the ecosystem which are clustered into the plurality of superclusters, which of the files have similar contents to each other, and merging the files which have similar contents to each other into the same supercluster, to capture possibly incremental changes to the files over time in one of the superclusters which has the files with identical contents and similar contents;

for each supercluster which has the files with identical and similar contents:

breaking the each supercluster down into package clusters, based on packages to which the files belong, each of the package clusters has the files from a same package; and determining which of the package clusters has most change frequency across versions of the files within the same package, as the authoritative package, wherein change frequency refers to how frequently the version is changed in relation to how frequently the package is released; then resolving an authoritative name for the files, based on the authoritative packages that are determined, across the plurality of superclusters which have files with identical and similar contents, and generating the authoritative name; and resolving any authoritative name collision.

9. The non-transitory computer-readable medium of claim 8, further comprising instructions for implementing:

a hash of file contents of each of the plurality of files is used to determine which of the files have identical contents, the clustering of the files in the superclusters with identical contents is determined based on the hashes of file contents, for the each supercluster, the each supercluster includes an indication of a source within the ecosystem for each file of the files, the breaking down into the package clusters is based on the indication of the source of the each file.

10. The non-transitory computer-readable medium of claim 8, wherein an abstract syntax tree of file contents of each of the plurality of files is used to determine whether contents of files are similar, the determining of files with similar contents into the same supercluster is based on the abstract syntax tree of file contents, for the each supercluster, the each supercluster includes an indication of a source within the ecosystem for each file of the files.

11. The non-transitory computer-readable medium of claim 8, wherein breaking each supercluster down into package clusters includes instructions for implementing:

generating package names and versions for members of the supercluster, aggregating package clusters on package name and counting unique changes to the package cluster, and determining, for each package cluster, the most change frequency among the package clusters.

12. The non-transitory computer-readable medium of claim 8, wherein the authoritative name is resolved by instructions for implementing:

merging authoritative package outliers into groups which are merged into package cluster based on file name, identifying the resolved authoritative name and source.

13. The non-transitory computer-readable medium of claim 8, further comprising further comprising instructions for implementing:
  determining whether the authoritative name source is correct based on ecosystem in which authoritative name source originated.

14. The non-transitory computer-readable medium of claim 8, wherein the ecosystem, in which the files are located which are clustered, includes at least one software repository in which the files are located.

15. A computer system that provides an authoritative name source for files within an ecosystem, comprising:
  at least one processor, the at least one processor is configured to:
    identify the ecosystem;
    cluster the files in the ecosystem into a plurality of superclusters, in which the files in each supercluster of the plurality of superclusters have identical contents; then
    determine, of the files in the ecosystem which are clustered into the plurality of superclusters, which of the files have similar contents to each other, and merge the files which have similar contents to each other into the same supercluster, to capture possibly incremental changes to the files over time in one of the superclusters which has the files with identical contents and similar contents;
  for each supercluster which has the files with identical and similar contents:
    break the each supercluster down into package clusters, based on packages to which the files belong, each of the package clusters has the files from a same package; and
    determine which of the package clusters has most change frequency across versions of the files within the same package, as the authoritative package, wherein change frequency refers to how frequently the version is changed in relation to how frequently the package is released; then
  resolve an authoritative name for the files, based on the authoritative packages that are determined, across the plurality of superclusters which have files with identical and similar contents, and generate the authoritative name; and
  resolve any authoritative name collision.

16. The computer system of claim 15, wherein
  a hash of file contents of each of the plurality of files is used to determine which of the files have identical contents,
  the clustering of the files in the superclusters with identical contents is determined based on the hashes of file contents,
  for the each supercluster, the each supercluster includes an indication of a source within the ecosystem for each file of the files,
  the processor is further configured to
    break down the each supercluster into the package clusters based on the indication of the source of the each file.

17. The computer system of claim 15, wherein
  an abstract syntax tree of file contents of each of the plurality of files is used to determine whether contents of files are similar,
  the determining of files with similar contents into the same supercluster is based on the abstract syntax tree of file contents,
  for the each supercluster, the each supercluster includes an indication of a source within the ecosystem for each file of the files.

18. The computer system of claim 15, wherein the processor is further configured to break down the each supercluster into the package clusters, to:
  generate package names and versions for members of the supercluster,
  aggregate package clusters on package name and counting unique changes to the package cluster, and
  determine, for each package cluster, the most change frequency among the package clusters.

19. The computer system of claim 15, wherein the processor is further configured to
  resolve the authoritative name, to:
    merge authoritative package outliers into groups which are merged into package cluster based on file name,
    identify the resolved authoritative name and source.

20. The computer system of claim 15, wherein the processor is further configured to
  determine whether the authoritative name source is correct based on ecosystem in which authoritative name source originated.

* * * * *